(12) United States Patent
Laterre

(10) Patent No.: US 12,488,173 B2
(45) Date of Patent: Dec. 2, 2025

(54) METHODS AND SYSTEMS FOR TRAINING A NEURAL NETWORK USING SEQUENTIAL MONTE CARLO PROCESSING

(71) Applicant: InstaDeep Ltd, London (GB)

(72) Inventor: Alexandre Laterre, London (GB)

(73) Assignee: Insta Deep Ltd, London (GB)

( * ) Notice: Subject to any disclaimer, the term of this patent is extended or adjusted under 35 U.S.C. 154(b) by 979 days.

(21) Appl. No.: 17/538,946

(22) Filed: Nov. 30, 2021

(65) Prior Publication Data

US 2022/0083864 A1 Mar. 17, 2022

Related U.S. Application Data

(63) Continuation of application No. PCT/GB2020/053052, filed on Nov. 27, 2020.

(30) Foreign Application Priority Data

Nov. 27, 2019 (GB) ...................................... 1917292
Nov. 27, 2019 (GB) ...................................... 1917293
(Continued)

(51) Int. Cl.
*G06N 20/00* (2019.01)
*G06F 30/3308* (2020.01)
(Continued)

(52) U.S. Cl.
CPC ........ *G06F 30/394* (2020.01); *G06F 30/3308* (2020.01); *G06F 30/3953* (2020.01);
(Continued)

(58) Field of Classification Search
CPC ............... G06F 30/394; G06F 30/3308; G06F 30/3953; G06F 30/398; G06F 2111/08;
(Continued)

(56) References Cited

U.S. PATENT DOCUMENTS

| 5,402,359 A | 3/1995 | Oyanagi |
| 7,657,860 B1 | 2/2010 | Brashears et al. |
| | (Continued) | |

FOREIGN PATENT DOCUMENTS

| JP | 2005078519 A | 3/2005 |
| TW | 201906525 A | 2/2019 |
| WO | 2018215665 A1 | 11/2018 |

OTHER PUBLICATIONS

United States Non-Final Office Action dated Apr. 25, 2023 for U.S. Appl. No. 17/538,977.
(Continued)

*Primary Examiner* — Hien L Duong
(74) *Attorney, Agent, or Firm* — EIP US LLP

(57) ABSTRACT

A computer-implemented method, a machine learning system, and non-transitory computer-readable storage medium for training a neural network are provided. The neural network is used to instruct an agent to select actions for interacting with an environment to determine a solution to a specified problem. In the computer-implemented method a state signal representing a current state of the environment is received. A Sequential Monte Carlo process is then used to perform a search to determine target action selection data associated with the current state of the environment. This target action selection data is stored in association with the state signal and the current state of the environment is updated by providing an action selection signal based on the target action selection data. The Sequential Monte Carlo process involves generating a plurality of simulations using the neural network to determine the target action selection data.

12 Claims, 19 Drawing Sheets

(30) Foreign Application Priority Data

Nov. 27, 2019 (GB) .................................... 1917294
Nov. 27, 2019 (GB) .................................... 1917295

(51) Int. Cl.
*G06F 30/394* (2020.01)
*G06F 30/3953* (2020.01)
*G06F 30/398* (2020.01)
*G06N 3/04* (2023.01)
*G06N 3/047* (2023.01)
*G06N 3/08* (2023.01)
*G06F 111/08* (2020.01)

(52) U.S. Cl.
CPC ............ *G06F 30/398* (2020.01); *G06N 3/04* (2013.01); *G06N 3/047* (2023.01); *G06N 3/08* (2013.01); *G06N 20/00* (2019.01); *G06F 2111/08* (2020.01)

(58) Field of Classification Search
CPC .......... G06F 30/27; G06N 3/04; G06N 3/047; G06N 3/08; G06N 20/00
See application file for complete search history.

(56) References Cited

U.S. PATENT DOCUMENTS

| | | | |
|---|---|---|---|
| 8,370,783 | B2 | 2/2013 | Uchino et al. |
| 10,437,954 | B1 | 10/2019 | White et al. |
| 10,846,453 | B1 | 11/2020 | Castle |
| 11,386,322 | B1 | 7/2022 | Ding et al. |
| 11,604,941 | B1* | 3/2023 | Hester .................. G06F 17/11 |
| 11,628,106 | B1 | 4/2023 | Chitalu et al. |
| 2001/0018760 | A1 | 8/2001 | Matsumoto |
| 2003/0023943 | A1 | 1/2003 | Teig et al. |
| 2003/0066044 | A1 | 4/2003 | Teig et al. |
| 2003/0079193 | A1 | 4/2003 | Teig et al. |
| 2006/0156266 | A1 | 7/2006 | Alpert et al. |
| 2009/0031275 | A1 | 1/2009 | Cho et al. |
| 2009/0144688 | A1 | 6/2009 | Uchino et al. |
| 2018/0307790 | A1 | 10/2018 | Chuang et al. |
| 2019/0250568 | A1* | 8/2019 | Li ........................ G06N 7/01 |
| 2019/0258918 | A1* | 8/2019 | Wang .................. G06N 3/088 |
| 2019/0332922 | A1* | 10/2019 | Nachum .............. G06N 3/08 |
| 2019/0354869 | A1* | 11/2019 | Warde-Farley ...... G06N 3/08 |
| 2020/0134445 | A1* | 4/2020 | Che .................... G06N 3/044 |
| 2020/0143239 | A1* | 5/2020 | Simonyan ........... G06N 3/006 |
| 2020/0151562 | A1* | 5/2020 | Pietquin .............. G06N 3/092 |
| 2021/0201156 | A1* | 7/2021 | Hafner ................ G06N 3/006 |
| 2021/0278825 | A1* | 9/2021 | Wen .................. G05B 19/41865 |
| 2021/0342516 | A1 | 11/2021 | Ren et al. |
| 2022/0366246 | A1 | 11/2022 | Danihelka et al. |
| 2022/0366247 | A1 | 11/2022 | Hamrick et al. |
| 2025/0051289 | A1* | 2/2025 | Wayne ................ G06N 3/0442 |

OTHER PUBLICATIONS

United States Non-Final Office Action dated May 25, 2023 for U.S. Appl. No. 17/538,987.
Lazaric et al., "Reinforcement learning in continuous action spaces through sequential Monte Carlo methods", NIPS 07: Proceedings of the 20th International Conference on Neural Information Processing Systems, pp. 833-840, Dec. 3, 2007.
Kitazawa et al., "A Look-Ahead Line Search Algorithm With High Wireability for Custom VLSI Design", Kyoto, Jun. 5-7, 1985; Proceedings of the International Symposium on Circuits and Systems, New York, IEEE, US, vol. 3, pp. 1035-1038, Jun. 1, 1985 (Jun. 1, 1985).
Chen et al., "Global and detailed routing", In: "Electronic Design Automation—Synthesis, Verification, and Test", Morgan Kaufman, XP055714202, ISBN: 978-0-12-374364-0, pp. 687-749, Jan. 1, 2009 (Jan. 1, 2009).
Freitas et al., "Sequential Monte Carlo Methods to Train Neural Network Models", Neural Computation United States May 2000, vol. 12, pp. 955-993, XP055782945, X 1-13 US ISSN: 1530-888X, DOI: 10.1162/089976600300015664, URL: https://www.mitpressjournals.org/doi/pdf/10.1162/089976600300015664, Apr. 1, 2000 (Apr. 1, 2000).
Sun et al.: "A multithreaded initial detailed routing algorithm considering global routing guides", Computer-Aided Design, ACM, 2 Penn Plaza, Suite 701NEW YORKNY10121-0701USA, pp. 1-7, XP058421057, DOI: 10.1145/3240765.3240777 ISBN: 978-1-4503-5950-4 the whole document, Nov. 5, 2018 (Nov. 5, 2018).
Zhou et al., "An accurate detailed routing routability prediction model in placement", 2015 6th Asia Symposium on Quality Electronic Design (ASQED), IEEE, pp. 119-122, XP033206637, DOI: 10.1109/ACQED.2015.7274019 the whole document, Aug. 4, 2015 (Aug. 4, 2015).
Laterre et al: "Ranked Reward: Enabling Self-Play Reinforcement Learning for Combinatorial Optimization", Presented at the Thirty-second Conference on Neural Information Processing Systems (NeurIPS 2018), Deep Reinforcement Learning Workshop, Montreal, Canada, Dec. 3-8, 2018.
Levine, Sergey: "Reinforcement Learning and Control as Probabilistic Inference: Tutorial and Review", arXiv:1805.00909v3, May 20, 2018.
Doucet et al: "An Introduction to Sequential Monte Carlo Methods" (2001) In: "Sequential Monte Carlo Methods in Practice. Statistics for Engineering and Information Science", Jun. 21, 2001.
Anthony et al: "Thinking Fast and Slow with Deep Learning and Tree Search", arXiv:1705.08439v4 [cs.AI], Dec. 3, 2017.
Ziebart et al: "Modeling Purposeful Adaptive Behavior with the Principle of Maximum Causal Entropy" Carnegie Mellon University, Dec. 1, 2010.
Silver et al: "A General Reinforcement learning Algorithm that Masters Chess, Shogi and Go Through Self-Play" Science vol. 362, Issue 6419 pp. 1140, Dec. 7, 2018.
Russell et al: "Artificial Intelligence a Modern Approach" Boston Pearson 2018 ISBN 978-0134610993, Dec. 1, 2009.
United Kingdom Combined Search and Examination dated May 14, 2020 for GB Application No. 1917293.1.
United Kingdom Combined Search and Examination dated May 14, 2020 for GB Application No. 1917292.3.
United Kingdom Combined Search and Examination dated May 14, 2020 for GB Application No. 1917294.9.
United Kingdom Combined Search and Examination dated Aug. 4, 2020 for GB Application No. 1917295.6.
International Search Report and Written Opinion dated Mar. 18, 2021 for PCT Application No. PCT/GB2020/053052.
International Search Report and Written Opinion dated Mar. 24, 2021 for PCT Application No. PCT/GB2020/053053.
International Search Report and Written Opinion dated Apr. 6, 2021 for PCT Application No. PCT/GB2020/053055.
International Search Report and Written Opinion dated Apr. 6, 2021 for PCT Application No. PCT/GB2020/053057.

* cited by examiner

METHODS AND SYSTEMS FOR TRAINING A NEURAL NETWORK USING SEQUENTIAL MONTE CARLO PROCESSING

CROSS-REFERENCE TO RELATED APPLICATIONS

This application is a continuation of International Application No. PCT/GB2020/053052, filed Nov. 27, 2020 which claims the benefit under 35 U.S.C. § 119(a) and 37 CFR § 1.55 to UK patent application no. GB1917292.3, filed on Nov. 27, 2019, UK patent application no. GB1917293.1, filed on Nov. 27, 2019, UK patent application no. GB1917294.9, filed on Nov. 27, 2019, and UK patent application no. GB1917295.6, filed on Nov. 27, 2019, the entire contents of which are incorporated herein by reference.

BACKGROUND OF THE INVENTION

Field of the Invention

The present disclosure relates to machine learning and circuit design. In particular, but not exclusively, the present disclosure relates to machine learning methods and systems, electrical circuit design, and the application of machine learning to electrical circuit design.

Description of the Related Technology

The present disclosure relates generally to the use of machine learning systems for solving specified problems using reinforcement learning techniques. Reinforcement learning techniques enable methods of determining solutions to specified problems and can iteratively improve solutions to specified problems based on self-play and/or feedback mechanisms used to evaluate potential solutions.

Solutions to problems which can appear simple to human experts may in fact involve a large number of possible actions and potential outcomes. Brute force techniques are unsuitable for use in solving such problems due to the limitations of current computing. Even where more advanced machine learning techniques are used, developing systems that are able to solve real world problems, which are by their nature highly complex, is a challenge. The ability to reduce the memory used and increase processing efficiency of such techniques is desired in order to allow the application of such techniques to solve technical problems.

Distributed computing systems are often used in order to provide increased computational power when attempting to solve highly complex problems. In order to allow distributed computational power to be used it is desired to increase the parallelizability and scalability of such machine learning techniques.

SUMMARY

According to a first aspect of the present disclosure, there is provided a computer-implemented method of training a neural network having a plurality of network parameter values, the neural network being used to instruct an agent to select actions for interacting with an environment to determine a solution to a specified problem, wherein the neural network is adapted to receive a state signal representing a state of the environment and to process the state signal according to the plurality of network parameter values to generate action selection data representing an action selection policy for selecting an action to be performed by the agent in response to the state signal, wherein the computer-implemented method comprises: receiving a state signal representing a current state of the environment; using a Sequential Monte Carlo process to perform a search to determine target action selection data associated with the current state of the environment, the Sequential Monte Carlo process comprising: generating a plurality of simulations each comprising a sequence of states and selected actions, each respective sequence starting at a first state of the environment and ending in a respective second state of the environment wherein the actions are selected using the neural network, and wherein at each state a weight value associated with the respective simulation is updated; storing data indicative of the plurality of simulations in a buffer as the plurality of simulations are generated; and determining the target action selection data by evaluating the weight values associated with the plurality of simulations; storing the determined target action selection data in association with the state signal representing the current state of the environment for updating the network parameter values; and updating the current state of the environment by providing an action selection signal based on the determined target action selection data.

This method allows solutions to sequential decision-making problems to be determined automatically. As the neural network is trained on a specified problem it becomes more efficient at guiding the search to promising solutions thereby reducing the computational expense required to generate a solution after each iteration. Using a Sequential Monte Carlo process to perform this search uses less memory when evaluating complex problems as compared to the use of a Monte Carlo Tree Search algorithm. Further, the memory usage of the present method is more predictable and consistent across a variety of specified problems as only data relating to a finite number of simulations is generated and stored.

According to a second aspect of the present disclosure there is provided a computer-implemented method for designing an electrical circuit, the computer-implemented method comprising: receiving input data representing three or more circuit elements in an electrical circuit, the three or more circuit elements including a first circuit element and a second circuit element; processing the input data to generate a representation of the electrical circuit, the representation being adapted to generate a state signal representing a configuration of the electrical circuit in response to receiving an action selection signal representing a decision with respect to a configuration of the electrical circuit; identifying a plurality of candidate routes for connecting the first circuit element to the second circuit element based on the representation, each of the plurality of candidate routes comprising a respective set of candidate sub-routes; and selecting a candidate route from the plurality of candidate routes by iteratively selecting candidate sub-routes by performing the steps of: using a Sequential Monte Carlo process to perform a look ahead search of a subset of the plurality of candidate routes by generating simulations in respect of candidate sub-routes of the subset of the plurality of candidate routes and according to the configuration, wherein the Sequential Monte Carlo process is guided using a neural network; determining target action selection data associated with the configuration by evaluating the simulations; updating the representation of the electrical circuit by providing an action selection signal representing a selection of a candidate sub-route based on the determined target action selection data; and receiving a state signal representing a configuration of the representation of the electrical circuit.

This method allows connections between circuit elements in an electrical circuit to be determined automatically. The neural network is trained as candidate sub-routes are selected and so the neural network becomes more efficient at guiding the search to promising solutions thereby reducing the computational expense required to select candidate sub-routes in each iteration. Using a Sequential Monte Carlo process to perform this search uses less memory when evaluating the candidate routes as compared to the use of a Monte Carlo Tree Search algorithm. This is of particular benefit in circuit design applications as the number of possible candidate routes and sub-routes in any given electrical circuit is often large. Evaluating the simulations to determine target action selection data involves determining the efficacy of each of the simulations for solving a specified problem. When evaluating the simulations, one or more characteristics of each simulation may be determined. For example, a predicted expected reward, an entropy, and/or one or more measures associated with optimization criteria of the specified problem may be determined for each simulation and used to evaluate the simulations. The efficacy of a simulation may also be referred to as the value of a simulation, the effectiveness of a simulation, or the usefulness of the simulation. The evaluation of the simulations may be comparative such that the efficacy of any given simulation is determined and/or defined with respect to other simulations. Alternatively, or additionally, the efficacy of a simulation may be based on criteria which is agnostic to the performance of other simulations, for example by comparing characteristics of the simulations with reference measures and/or threshold measures. In some cases, weight values, which are indicative of the efficacy of the simulations, are evaluated in order to determine the target action selection data.

According to a third aspect of the present disclosure there is provided a computer-implemented method for designing an electrical circuit, the computer-implemented method comprising: receiving input data representing three or more circuit elements in an electrical circuit, the three or more circuit elements including a first circuit element and a second circuit element; processing the input data to generate a representation of the electrical circuit; repeatedly performing a first process identify a plurality of candidate routes for connecting the first circuit element to the second circuit element based on the representation, each candidate route comprising one or more candidate sub-routes and each candidate sub-route comprising at least two points representation of the electrical circuit, the first process comprising: selecting a first point in the representation of the electrical circuit; executing a second process to identify a set of candidate points neighboring the first point in the representation of the electrical circuit based on at least one constraint and a topology of the electrical circuit; and selecting a second point from the set of candidate points, whereby to identify a candidate route comprising the selected first point and the selected second point, wherein the second process comprises evaluating at least one candidate path extending in a linear direction from the first point to identify the set of candidate points based on the at least one constraint and the topology of the electrical circuit; and selecting a candidate route from the plurality of candidate routes based on a look ahead search.

This method prioritizes the selection of candidate routes which are more likely to provide efficient connections between the first and second circuit elements. Routes which are not valid based on the topology and constraints of the circuit are not identified as candidate routes, and so computational power is not wasted evaluating these routes.

According to a fourth aspect of the present disclosure, there is provided a computer-implemented method for designing an electrical circuit, the computer-implemented method comprising: receiving input data representing a plurality of circuit elements in an electrical circuit, each of the plurality of circuit elements comprising at least one terminal, the input data further comprising an indication of a plurality of connections including a first connection between a first pair of terminals and a second connection between a second different pair of terminals; processing the input data to generate a representation of the electrical circuit, the representation being adapted to generate a state signal representing a configuration of the electrical circuit in response to receiving an action selection signal representing a decision with respect to a configuration of the electrical circuit; and determining routes for the first and second connections by iteratively: defining one or more orders in which to determine routes for the first and second connections; using a Sequential Monte Carlo process to perform a look ahead search of each defined order by generating simulations in respect of routes to be determined for the connections in the one or more orders, wherein the Sequential Monte Carlo process is guided using a neural network; determining a posterior distribution over the orders by evaluating the simulations; selecting a connection from the first and second connections based upon the determined posterior distribution over the orders; determining a route for the selected connection; and updating the representation of the electrical circuit by providing an action selection signal representing the determined route for the selected connection.

This method allows connections between circuit elements in an electrical circuit to be determined automatically and in an order which provides desired characteristics of the electrical circuit. The neural network is trained as connections, the routes for which are to be determined, are selected. In this way the neural network becomes more efficient at guiding the search to determining connections in the electrical circuit in orders which provide more promising results. This in turn, reduces the computational expense required to select determine the order in which the connections are to be determined. Using a Sequential Monte Carlo process to perform this search uses less memory when evaluating defined orders as compared to the use of a Monte Carlo Tree Search algorithm. When determining a posterior distribution over one order, the method will act deterministically. In other words, where there is only one order the posterior distribution will be a probability of one, or 100%, for that order. In this case, the one order will be the order in which the first and second connections will be determined. This may be the case where there are restrictions on the orders which can be defined, based on, for example, topological, physical, and manufacturing restrictions associated with the electrical circuit. While this method includes defining one or more orders in which to determine the routes, it is preferable to define two or more orders in which to determine the routes for the first and second connections. Where two or more orders are defined, the method is able to provide a selection of a preferred order of the two or more orders, based on optimization criteria for the electrical circuit.

According to a fifth aspect of the present disclosure there is provided a computer-implemented method for designing an electrical circuit, the computer-implemented method comprising: receiving input data representing a plurality of circuit elements in an electrical circuit, each of the plurality of circuit elements comprising at least one terminal, the input data further comprising an indication of a plurality of connections including a first connection between a first pair of terminals and a second connection between a second different pair of terminals; processing the input data to generate a representation of the electrical circuit, the representation being adapted to generate a state signal representing a configuration of the electrical circuit in response to receiving an action selection signal representing a decision with respect to a configuration of the electrical circuit; and determining routes for the first and second connections by iteratively: defining two or more orders in which to determine routes for the first and second connections; using a Sequential Monte Carlo process to perform a look ahead search of each defined order by generating simulations in respect of routes to be determined for the connections in the two or more orders, wherein the Sequential Monte Carlo process is guided using a neural network; determining a posterior distribution over the orders by evaluating the simulations; selecting a connection from the first and second connections based upon the determined posterior distribution over the orders; determining a route for the selected connection; and updating the representation of the electrical circuit by providing an action selection signal representing the determined route for the selected connection. Similar to the fourth aspect, this method allows connections between circuit elements in an electrical circuit to be determined automatically and in an order which provides desired characteristics of the electrical circuit. In this method, there are two or more orders defined, such that the method identifies which order of the two or more orders, is a preferred order for determining routes for the connections. In this way, the method makes a selection of an order according to optimization criteria associated with the electrical circuit such that the order which is selected is an order which, when used when determining routes for the electrical connections, results in electrical connections having preferred characteristics. This is of particular benefit in circuit design applications as the number of possible orders in which connections between circuit elements can be determined in any given electrical circuit is often large.

Further features and advantages will become apparent from the following description of preferred embodiments of the invention, given by way of example only, which is made with reference to the accompanying drawings.

DETAILED DESCRIPTION

Figure 1:
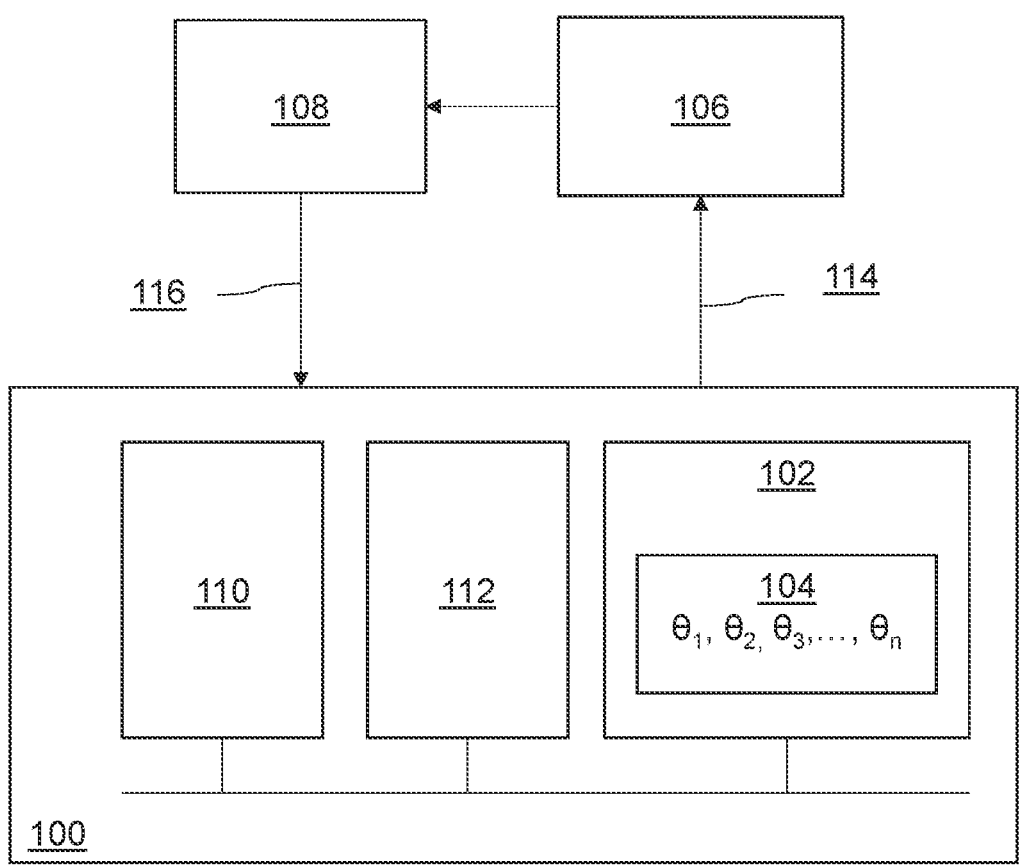
FIG. 1 is a schematic illustration of a machine learning system according to an example.

Reinforcement learning techniques have achieved promising results in solving technical problems in a number of applications. The ability of classifiers, such as those implemented by neural networks, to identify optimal strategies provides many benefits. Classifiers are able to be trained to solve problems by adapting them to receive information relating to the problems to be solved and using self-play to iteratively increase the value of the solutions they determine. The ability of classifiers to iteratively improve their ability to identify solutions to complex problems makes them ideal candidates for solving sequential decision-making problems.

Further, the use of certain classifiers reduces the amount of storage needed as compared to algorithms which use brute force analysis to simulate and store all possible solutions to a specified problem. In cases where the problem to be solved is a complex task, it is computationally expensive to use a brute force approach to solve the problem and hence can make the large scale application of such methods impractical.

The algorithm AlphaZero created by DeepMind® has been developed to play games such as Chess and Go. AlphaZero is a general-purpose algorithm that uses reinforcement learning from self-play to iteratively improve the ability of the algorithm. AlphaZero does this without domain-specific human knowledge or prior data regarding the problem. AlphaZero uses deep-neural networks, a general-purpose reinforcement algorithm, and a general-purpose tree search algorithm.

Where AlphaZero is applied to specific games such as Go or Chess, the neural network generates a vector of move probabilities in any given state of the game and a value estimating an expected outcome in that state. The neural network is trained to generate the move probabilities and expected outcome values based on self-play. These are used to guide a search of game states in future games in order to play the game.

A Monte Carlo Tree Search (MCTS) algorithm is used to generate a series of simulated games that traverse from a current state of the game to a terminal state. During the MCTS, moves are selected based on their move probabilities, value, and visit count. Self-play games used for reinforcement learning are performed by running an MCTS in each game state and selecting a next state based on the outcome of the MCTS. Once the game reaches a terminal state, an outcome is determined and the nodes in the tree are updated.

Methods such as that of AlphaZero have been shown to successfully solve problems and even to beat expert human players in certain games. However, the use of MCTS means that as the searches are performed, the tree which represents game states and stores visit counts for each state is maintained in memory. When assessing complex problems this storage of data relating to the entirety of the search space may be prohibitively memory consuming. Further, where the tree is large, memory access procedures which are required to access data relating to the tree during searches are hindered.

Certain examples described herein relate to a method of training a neural network for use in selecting actions in a machine learning algorithm to determine a solution to a specified problem. The method involves using a Sequential Monte Carlo process to perform a look ahead search in a way which is efficient, scalable, and allows modification to investigate solutions having specific properties. The neural network is updated based on these searches and iteratively trained such that future searches which are performed are more accurate. This training process is performed iteratively to constantly improve the accuracy of the neural network and its ability to guide further searches to identify optimum solutions to a specified problem.

In some examples, resources such as memory and computational power, used for the Sequential Monte Carlo processes are redistributed while the search is being performed. The look ahead searches are monitored and tuned in order to increase their efficiency.

One domain where the use of machine learning techniques is currently underutilized is electrical circuit design. In particular, the routing of connections between components in electrical circuits is typically performed by human experts. These include circuit architects who determine the position of components in an electrical circuit and connection routes between the components. This is likely due to the large amount of design freedom in selecting connection routes between components, the growing complexity of electrical circuits and their required connections, and the interdependence between selecting connection routes between components.

Certain examples described herein relate to methods of designing electrical circuits. These methods include the use of reinforcement learning techniques utilizing Sequential Monte Carlo processes to perform look ahead searches in order to identify and select connection routes between components.

Further improvements can be made by framing the problem to be solved in an appropriate manner which is specifically adapted to be processed using Sequential Monte Carlo processes. The degree of freedom involved in selecting connection routes between components in an electrical circuit can make designing such electrical circuits, even for highly efficient programs, difficult. Accordingly, certain other examples described herein are directed towards processing data representing an electrical circuit to generate a representation having a reduced number of potential connections routes. Reinforcement learning techniques may then be applied to representations having a reduced number of potential connection routes to design electrical circuits.

i. General Sequential Monte Carlo Method

FIG. 1 shows a system 100 for training a neural network. The system 100 is an example of a system 100 implemented as one or more computer program modules. The one or more computer program modules can be run either on a single machine or across multiple machines in the same or different locations.

The system 100 comprises a neural network 102 which has a plurality of network parameter values 104. The neural network 102 is used to instruct an agent 106 to select actions for interacting with an environment 108 to determine a solution to a specified problem. The neural network 102 is adapted to receive a state signal 116 generated by the environment 108 which represents a state of the environment 108. The neural network 102 processes the state signal 116 according to the plurality of network parameter values 104 to generate action selection data. The action selection data represents an action selection policy for selecting an action to be performed by the agent 106 in response to the state signal 116.

The environment 108 is configured to represent the specified problem. For example, where the problem is a bin packing problem, the environment 108 represents the bin to be packed and a state of the items to be packed within the bin. This may be the position and rotation of items which have been placed in the bin, and detail regarding items yet to be placed in the bin. The environment 108 is adapted to receive an action selection signal 114 representing the position at which an item is to be placed. The environment 108 is updated, based on this information, to represent a new state of the bin and the remaining items. This new state of the bin and items is output as a state signal 116 representing the current state of the environment 108. In this way, sequential decisions are made and the environment 108 is updated until the environment 108 is in a state in which the specified problem has been solved or no further actions can be taken.

The system 100 comprises a buffer 110 and a training engine 112. The buffer 110 is suitable for storing data relating to a Sequential Monte Carlo process, and the training engine 112 is adapted to perform an iterative process which includes the Sequential Monte Carlo process. The iterative process is used to investigate solutions to the specified problem and is guided by the neural network 102. While investigating the potential solutions to the problem, the neural network 102 is updated such that as the iterative process is repeated, promising solutions can be more readily identified and investigated. This in turn increases the efficiency of using the system 100 to determine a solution to the specified problem, reducing the amount of computational power needed to determine the solution to the problem. The iterative process performed by the training engine 112 will now be described by means of a method 200 shown in FIG. 2.

Figure 2:
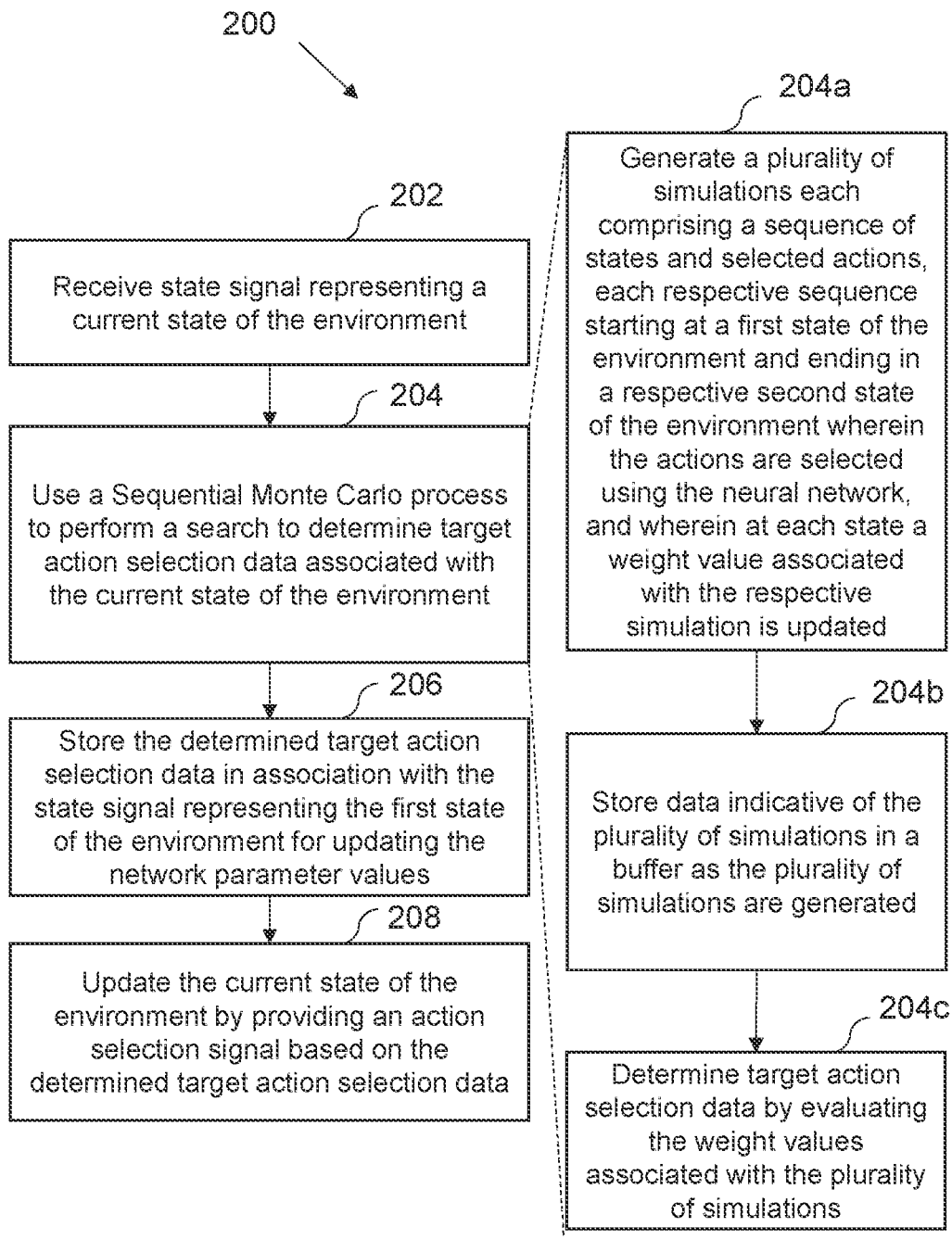
FIG. 2 is a flow diagram of a computer implemented method according to an example.

The flow chart 202 to 208 of FIG. 2 shows an example of a method 200 which is used by the training engine 112 to train the neural network 102. At a first block 202, the method 200 comprises receiving a state signal 116 representing a current state of the environment 108. At a second block 204, the training engine 112 uses a Sequential Monte Carlo process to perform a search to determine target action selection data associated with the current state of the environment 108. The Sequential Monte Carlo process involves the use of a neural network 102 to search possible future states and actions available in an attempt to find solutions to the specified problem (steps 204a-204c, described below). The neural network 102 is used by the training engine 112 to select actions based on some initial action selection policy. The target action selection data represents an updated action selection policy which is generated based on the results of the Sequential Monte Carlo process. At a third block 206, the determined target action selection data is stored in the system 100 in association with the state signal 116 representing the current state of the environment 108. The target action selection data is stored for updating the network parameter values 104 such that in future iterations, the action selection policy of the neural network 102 is closer to the updated action selection policy. At a fourth block 208, the current state of the environment 108 is updated by the training engine 112 providing an action selection signal 114, based on the determined target action selection data, to the agent 106.

Figure 3:
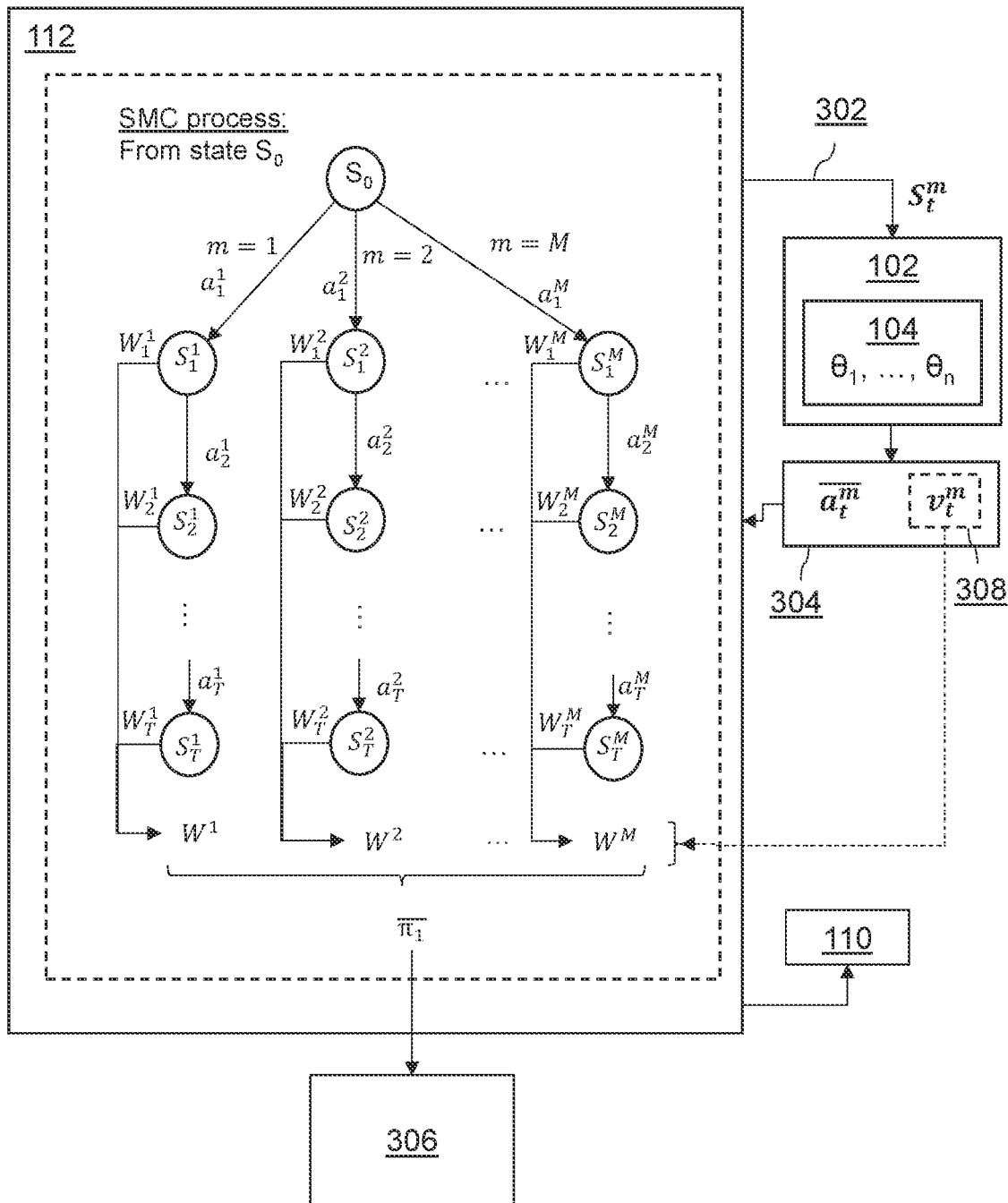
FIG. 3 is a schematic illustration of a Sequential Monte Carlo process according to an example.

As mentioned above the steps involved in the Sequential Monte Carlo process are shown in blocks 204a to 204c of FIG. 2. These will now be described in detail with reference to FIG. 3. Starting at a first state $S_0$, a plurality of simulations is generated using the training engine 112. Each simulation comprises a sequence of states and selected actions. A first simulation is shown in FIG. 3 as the branch comprising the sequence of states and actions $[S_0, a_1^1, S_1^1, a_2^1, S_2^1 \ldots a_T^1, S_T^1]$. A second simulation is shown as the branch comprising $[S_0, a_1^2, S_1^2, a_2^2, S_2^2 \ldots a_T^2, S_T^2]$. As can be seen in FIG. 3, the sequences each start at the first state $S_0$ of the environment 108 and end in a respective second state, $S_T^1$, $S_T^2$ of the environment 108. In the example of FIG. 3, states $S_T^1$ and $S_T^2$ are shown as separate states; however, it will be appreciated that in some cases the second state of a first simulation may correspond to the second state of a second simulation.

To generate any particular, or given, simulation the training engine 112 instructs an agent 106 to update an environment based on the selected actions $a_t^m$ by providing action selection signals. The training engine 112 then stores the sequence of selected actions $a_t^m$ and states $S_t^m$. To this end, a plurality of clones of the environment 108 may be used, one for each simulation, so as not to affect the environment 108 which maintains a current state of a solution to the specified problem. The plurality of cloned environments may be virtualized and distributed across a plurality of virtualized machines which may be comprised in the same or multiple physical computers. Similarly, a plurality of virtualized agents may be used to interact with the plurality of clone environments.

When generating the plurality of simulations, the actions are selected by the training engine 112 using the neural network 102. This is shown in FIG. 3 in which the neural network 102 is provided with a received state signal 302 representing a given state $S_t^m$ and processes this signal 302 in accordance with the network parameter values 104 to generate action selection data 304. The action selection data 304 includes a distribution $\overline{a_t^m}$ over available actions $a_t^m$ from the given state $S_t^m$. This distribution $\overline{a_t^m}$ is representative of an action selection policy which is dependent on the current network parameters values 104 of the neural network 102. In the present example, the distribution $\overline{a_t^m}$ comprises a vector, wherein each vector component corresponds to an available action in the given state $S_t^m$ and comprises a probability of the selection of the respective action. However, in other examples, the distribution $a_t^m$ may be a continuous function defining the probability.

The action selection data 304 is used by the training engine 112 to select actions to generate the simulations. Starting from an initial state $S_0$, an initial distribution $\overline{a}_1$ over the available actions $a_1^1, a_1^2, \ldots, a_1^M$ is generated by the neural network 102. This distribution $\overline{a}_1$ may be referred to as a prior distribution. When the system 100 is first implemented in an attempt to solve a specified problem, the network parameter values 104 will be untrained. Hence, when starting in an initial state $S_0$ the distribution $\overline{a}_1$ will be a uniform distribution over all available actions $a_1^1$ to $a_1^M$.

Target action selection data 306 which is determined by the training engine 112 from the plurality of simulations starting at $S_0$ includes a distribution $\overline{\pi}_1$ over the available actions $a_1^1$ to $a_1^M$ from the state $S_0$. This distribution $\overline{\pi}_1$ may be referred to as a posterior distribution. The target action selection data 306 which is stored will be used by the training engine 112 to train the network parameter values 104 of the neural network 102. In this way, the neural network 102 will have some knowledge about the potential value of particular states. As such, the action selection data 304 generated by the neural network 102 in future iterations of the process will guide the selection of actions made by the training engine 112 towards more promising solutions when generating simulations.

The training engine 112 trains the neural network 102 by updating the network parameter values 104 in order to minimize a difference between prior distributions $a_t^m$ generated by the neural network 102 and posterior distributions $\overline{\pi}_t^m$ determined by the Sequential Monte Carlo process. In the present example, the training engine 112 trains the network parameter values 104 by adjusting the network parameter values 104 by gradient descent on a loss function that sums over mean-squared error and cross-entropy losses. However, any other suitable training processes may be used which allow the prior distributions $a_t^m$ generated by the neural network to more closely match the posterior distributions $\overline{\pi}_t^m$ resulting from the Sequential Monte Carlo process.

The plurality of simulations generated for a given iteration of the Sequential Monte Carlo process will include a finite number of simulations, for instance 1000 simulations may be generated from a starting state $S_0$. The total number of simulations which are generated can be tuned depending on the complexity of the specified problem and hence the number of available actions which are present in each state. For example, where the specified problem is highly complex and there are 1000 available actions in state $S_0$, then 100000 simulations may be used to perform the search. However, where there are fewer available actions in state $S_0$, say 10, then 1000 simulations may be sufficient to effectively perform a search to determine target action selection data 306.

When using an MCTS, as in known methods, to perform a search of possible future states to solve a specified problem, data indicative of a tree representing the possible future states is stored in memory. This data may include the actions connecting the possible future states. As searches are performed this data may include indications of visit counts, values, and other data relating to each state The amount of data which is stored is dependent on the size of the search tree which in turn is constrained by the size and/or complexity of the problem to be solved. Therefore, when tackling complex problems represented by large trees, the amount of data which is necessary to store in memory may hinder the efficiency of such a system to search and evaluate possible future states of the environment 108.

When a search is performed using a Sequential Monte Carlo process, as in the present disclosure, the amount of data which is stored is limited only by the number of simulations, since only the data indicative of the plurality of simulations is stored. The number of simulations which are generated may be independent of the size or complexity of the problem to solved.

Known methods which use MCTS processes to perform look ahead searches rely on the environments with which they operate to be deterministic. This is due to the requirement of maintaining data indicative of the search tree in memory, wherein the search tree directly links given actions and states. By using Sequential Monte Carlo processes in order to perform the look ahead search, the present method is applicable to non-deterministic environments, as well as to deterministic environments, for example where there is some stochastic perturbance in the environment 108.

In a non-deterministic environment, starting in a given state and taking an action will, in a first instance, put the environment into a state $S_1$. If the same action is taken in the given state for a second simulation, the environment may be put into a different state $S_2$. This is possible using the method 200 as described herein because weight values are used to monitor and assess the simulations. These weight values are described further below.

As the simulations progress, data indicative of the plurality of simulations is written to the buffer 110 and replaces data previously stored in the buffer 110, e.g. for previous simulations. This is possible because it is not necessary to keep the data once the neural network 102 has been updated and is of particular benefit where the buffers have a fixed capacity. Also, in this way, the memory usage of the system 100 is reduced as it is not necessary to continually store data indicative of the plurality of simulations to perform subsequent Sequential Monte Carlo processes.

The target action selection data 306 is determined by evaluating the simulations. In the present example, each simulation is associated with a weight value $W^m$ and the weight value $W^m$ of each simulation is updated at each state of the respective simulation. The target action selection data 306 is determined by evaluating the weight values $W^1$ to $W^M$ for the plurality of simulations. The weight values $W^1$ to $W^M$ associated with each simulation are representative of the value of the solutions to the specified problem, modelled by the respective simulations. The value of a solution is determined based on criteria defined in the specified problem. A value of a solution effectively quantifies how well that solution satisfies an optimization criterion which as associated with the specified problem. For example, where the specified problem is a bin packing problem, the value of a solution may relate to the remaining volume in the bin once all items have been placed within it, or a number of remaining items once the bin has been packed. Here, the optimization criterion is to minimize empty space in the bin, or to put it another way, to maximize occupancy of items within the bin. In order to generate the target action selection data 306, the weight values $W^1$ to $W^M$ associated with the plurality of simulations are evaluated to determine the posterior distribution $\overline{\pi}_1$. Weight values $W^m$ corresponding to simulations which share the same initial action, for example $a_1^1$, will be averaged when determining the posterior distribution over the available actions $a_1^1, a_1^2, \ldots, a_1^M$ from state $S_0$.

The weight values $W^1$ to $W^M$ are updated for each state of their respective simulations. In some applications, rewards are available at each state in a simulation. For example, where the problem to be solved is the treatment of a patient with a given medical condition, the actions may represent different clinical actions to be performed and the states may represent an outcome for a patient following each clinical action. In this case, the reward available at each state may be a measure of the patient outcome. The measure of a patient outcome can include results from tests performed on the patient. As such, updating a weight value $W^m$ at a given state $S_t^m$ for a particular simulation may comprise calculating a reward value associated with the given state $S_t^m$ and using this reward value to update the weight value $W^m$.

In other applications, rewards are scarce, and it is not possible to calculate a reward at each state. For example, where the problem to be solved includes selecting moves in a game of chess, rewards may not be easily determined in each state (following each move). In such applications, it may be possible to estimate rewards, more frequently than they are generally available, and use these estimates to update the weight values $W^1$ to $W^M$. To this end, the neural network 102 may also be adapted to generate predicted expected reward data 308 in response to a received state signal 302 by processing the received state signal 302 according to the network parameter values 104. The predicted expected reward data 308 comprises a predicted expected reward value $v_t^m$ representing an expected reward for simulations at state $S_t^m$. At each state $S_t^m$ of a given simulation, the weight value $W^m$ for the given simulation may be updated based on the predicted expected reward data 308 generated by the neural network 102 in response to the state signal 302 representing the given state $S_t^m$. In other words, for each state $S_t^m$ a predicted expected reward value $v_t^m$ may be determined for the given state $S_t^m$ and used to update the respective weight value $W^m$. Alternatively, if rewards are scarce, the weight values $W^1$ to $W^M$ may be updated using the rewards when they are available but may update the weight values $W^1$ to $W^M$ based on some other variables at each state, for example based on an entropy of the simulation. A predicted expected reward may be a cumulative expected reward in which the predicted reward corresponds to a sum of predicted rewards at each state from the current state $S_t^m$ to a terminal state $S_T^M$ of the simulation. The predicted expected reward may alternatively by an instantaneous expected reward dependent on a final outcome of the simulation.

In other examples, evaluating the simulations includes evaluating characteristics of each simulation, such as a predicted expected reward, entropy, criteria associated with the specified problem, which is to be solved, and other suitable characteristics. The evaluation of the simulations may be comparative such that the efficacy of any one of the simulations is defined in relation to the other simulations. Alternatively, or additionally, the characteristics of each simulation may be compared to one or more reference values and/or threshold values when evaluating the simulations to determine the target action selection data.

The predicted expected reward data 308 generated by the neural network 102 may also be used by the training engine 112 to select actions when generating the plurality of simulations. To this end, the predicted expected reward data 308 may be comprised in the action selection data 304 as shown in FIG. 3.

The efficiency of the Sequential Monte Carlo process can be increased by monitoring and redistributing simulations as they are generated. For example, as the plurality of simulations are generated, a first subset of the simulations may be investigating less promising sequences of actions and states such as sequences of actions and states which are not suitable for solving the specific problem. Others of the first subset of the simulations may investigate potential solutions to the specified problem which are low value, for example due to being less efficient potential solutions.

In order to increase the efficiency of the Sequential Monte Carlo process, weight values associated with the plurality of simulations are monitored by the training engine 112. Those solutions with low weight values (those referred to above as the first subset of the plurality of simulations) may be regenerated. A second subset of the simulations may be investigating more promising solutions for solving the specific problem, for example, simulations which relate to high value solutions. The first subset of the plurality of simulations can then be regenerated by cloning the second subset of the plurality of simulations.

In this way, the available computational power may be focused on investigating more promising potential solutions. This also allows the total number of simulations which are generated in the Sequential Monte Carlo process to be reduced, thereby further decreasing the memory usage necessary to perform the search.

The simulations are independently generated by the using the neural network 102. For each simulation a series of actions are selected by the training engine 112 using action selection data 308 generated by the neural network 102 for each state in the respective simulations. As such, this method 200 provides increased scalability as the simulations can be parallelized and implemented across multiple threads and/or across multiple machines.

The foregoing will now be explained by means of an example, in which regenerating the first subset of the plurality of simulations involves taking the weights $W^1$ to $W^M$ of the simulations, and dividing them by the sum to get a probability distribution over the simulations. The second subset of the plurality of simulations which are selected to be cloned are selected based on this probability distribution.

In the present example, monitoring the weight values $W^1$ to $W^M$ associated with the plurality of simulations comprises identifying which of the weight values $W^1$ to $W^M$ are collapsing, in other words decreasing towards zero. In order to do this, a plurality of variance measures associated with the weight values $W^1$ to $W^M$ are updated by the training engine 112. This plurality of variance measures may be updated each time the weight values $W^1$ to $W^M$ are updated or less frequently than this. The plurality of variance measures is then compared to a predetermined threshold. By monitoring a variance measure associated with a weight value $W^m$ the simulations which have a collapsing weight value $W^m$ potential solutions may be readily identified.

Identifying simulations whose weight values $W^m$ are collapsing to zero may be more likely to produce suitable candidates for regeneration when comparing the weight values $W^1$ to $W^M$ with a predetermined threshold. This is because while generating the plurality of simulations, some of the weight values $W^1$ to $W^M$ may be low for a period of time but may later increase in value if a promising solution to the specified problem is discovered. In particular, simulations which begin to model states which have not yet been explored by other simulations may initially have low weights. However, these unexplored states may be part of potential solutions which have high rewards and so it is beneficial to maintain some simulations which have low but stable weight values $W^1$ to $W^M$.

Alternatively, the monitoring may involve comparing the weight values $W^1$ to $W^M$ to one or more predetermined thresholds as this is less computationally expensive than tracking variance measures associated with the weight values $W^1$ to $W^M$. In such a case, the weight values $W^1$ to $W^M$ can be modified such that explorative simulations are rewarded even where there are low rewards or expected rewards. Where the weight values have been modified to reward explorative simulations, a process of comparing the weight values to a predetermined threshold is less likely to identify highly explorative simulations for regeneration than if the weights were dependent only on rewards or expected rewards.

In order to promote the exploration of underexplored potential solutions, the weight values $W^1$ to $W^M$ may be updated according to associated entropy values which are determined for each of the simulations. In this case each simulation may be associated with an entropy value which is updated by the training engine 112 after selecting each action when generating the plurality of simulations. The entropy value $H^m$ for a given simulation comprising a given sequence of states and selected actions can be used to track the likelihood of the given simulation to comprise the given sequence of states and selected actions. After each action is selected when generating the plurality of simulations, the entropy value $H^m$ is then updated based on the probability associated with the selected action $a_t^m$ according to respective prior distribution $\overline{a_t^m}$ used to select the selected action $a_t^m$. In this way, simulations that include actions having low probabilities in their associated prior distributions will be provided with a high entropy value $H_m$. Updating a weight value $W^m$ at a given state $S_t^m$ may include calculating the product of the weight value in the previous step, a reward, and an entropy value determined based on the selected action $a_t^m$ which caused the simulation to enter state $S_t^m$.

Selecting the first subset of the plurality of simulations, which, it will be recalled are those simulations that are to be regenerated, can be triggered by the monitoring of the weight values $W^1$ to $W^M$. For example, as each weight value $H^m$ is updated, the value may be assessed, either directly or by a measure associated with the weight value $H^m$ such as variance. Once a predetermined number or proportion of the simulations are identified as simulations which are to be regenerated, the method may at that stage select them for regeneration. Triggering the regeneration in this way allows the simulations to evolve and develop before being regenerated. This can help increase the diversity in the population of simulations.

Generally speaking, fluctuations in the weight values for simulations may occasionally make a simulation eligible for regeneration. Another option is to allow simulations which may have low weight values for a time to continue to select actions so as not to over-train the simulations. Alternatively, the process of selecting the first subset of the plurality of simulations may be performed periodically or after a predetermined number of actions have been selected for each simulation.

Figure 4:
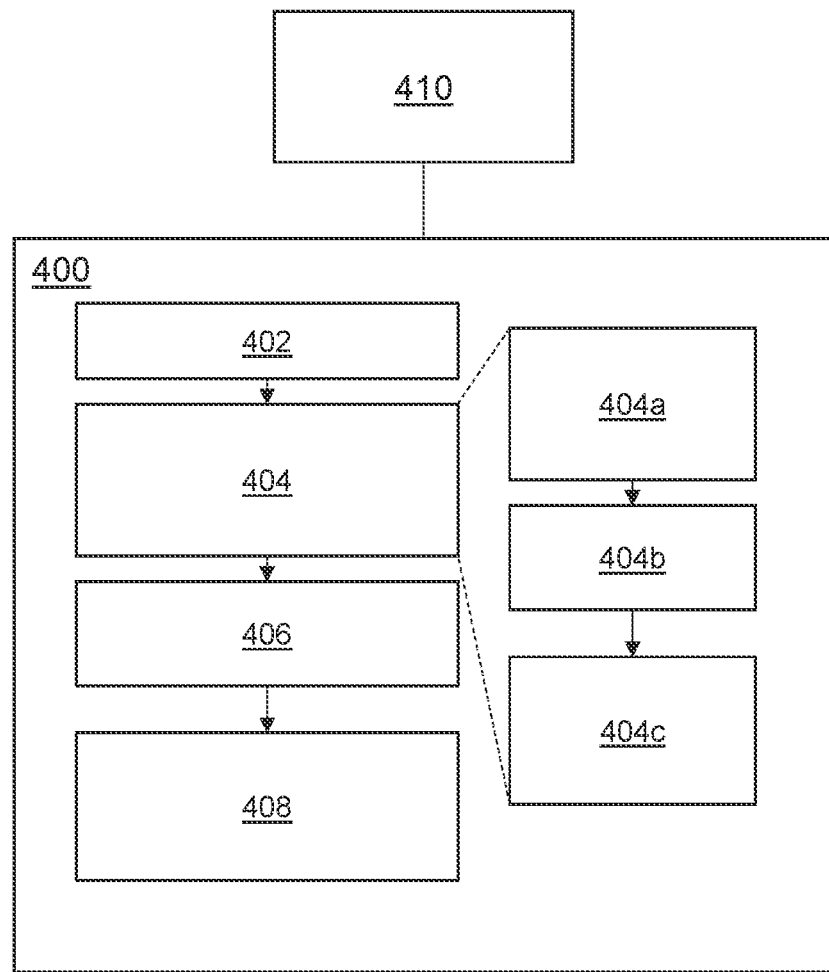
FIG. 4 is a schematic illustration of a non-transitory computer-readable storage medium comprising computer-readable instructions according to an example.

FIG. 4 shows a non-transitory computer-readable storage medium 400 comprising computer-readable instructions 402 to 408 which, when executed by at least one processor 410, cause the at least one processor 410 to perform the method 200 as described above in relation to FIGS. 1 to 3. In FIG. 4, the blocks 402 to 408 shown correspond to the blocks 202 to 208 shown in FIG. 2 where the suffix corresponds to the same steps. In other words, block 202 of the flow chart in FIG. 2 corresponds to the block 402 in FIG. 4, block 204 corresponds to block 404 and so on.

ii. Circuit Design Application of Sequential Monte Carlo Process (Low Level)

One domain for which the methods and system described above may be of particular benefit is in the domain of electrical circuit design. As discussed earlier the design of electrical circuits is complex due to the degree of freedom and design constraints involved. Electrical circuit design can be separated into several stages from the specification of the system, to determining functional block diagrams and logic design, and eventually the design of the topology and routing of the electrical circuit. One particular problem in the electrical circuit design is the place and route problem. The place and route problem involves determining how to route connections between components in the electrical circuits while adhering to the fabrication constrains for the given electrical circuit. This problem is present in the design of a variety of electrical circuits, including the design of printed circuit boards, Field Programmable Gate Arrays (FPGA), Graphical and central processing units (GPUs and CPUs), and integrated circuits, such as application specific integrated circuits (ASIC) designed to perform specified tasks.

In order to be able to successfully determine the route for connections in an electrical circuit, a method which can efficiently analyses and select potential routes for connections is desired.

Figure 5:
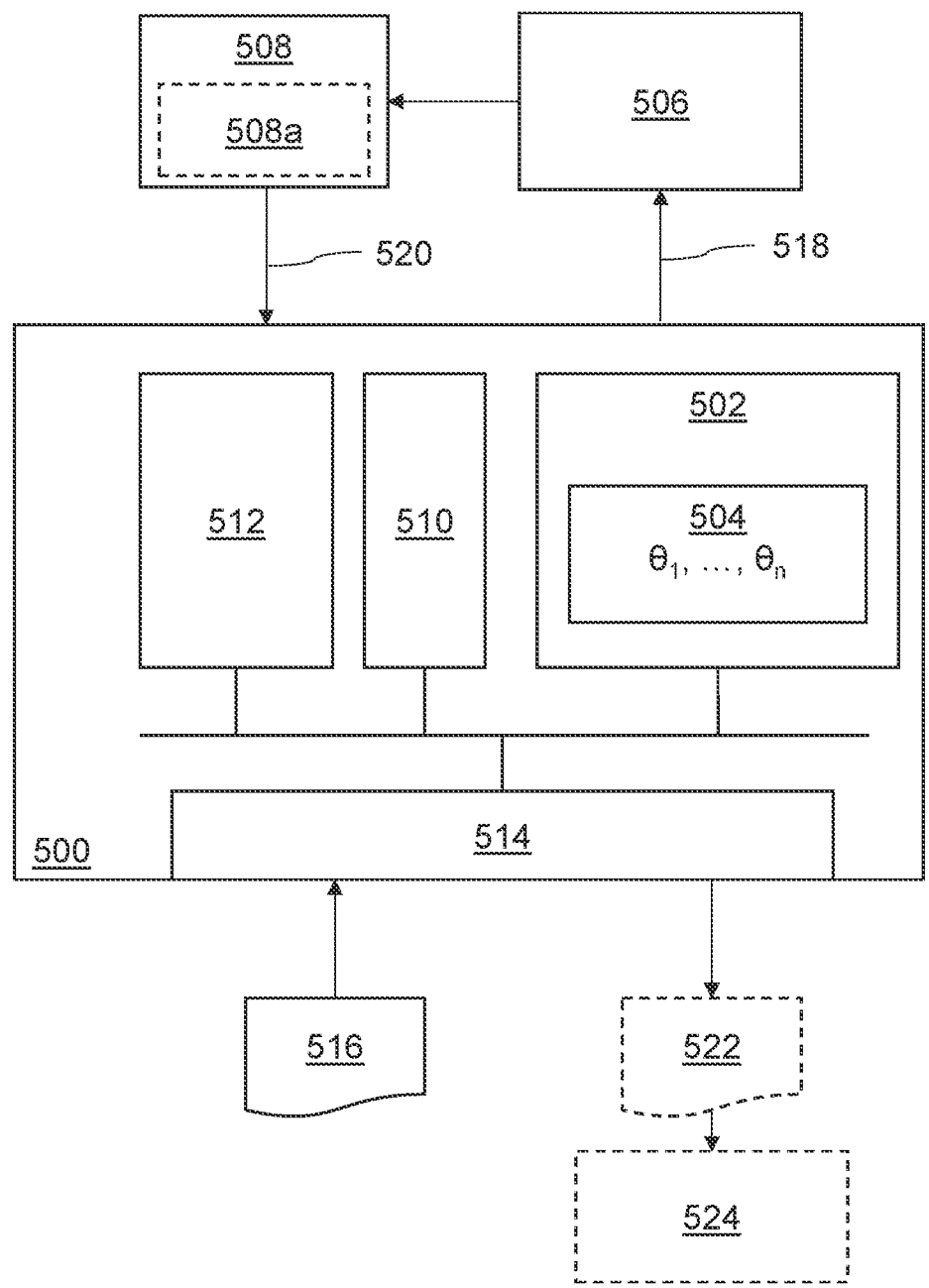
FIG. 5 is a schematic illustration of a machine learning system for designing an electrical circuit according to an example.

FIG. 5 shows an application specific machine learning system 500 for designing electrical circuits which utilizes methods as described in relation to FIGS. 1 to 3. The application specific system 500 comprises a neural network 502 having a plurality of network parameter values 504, a buffer 510, a processing engine 512, and an interface 514, for receiving input data 516. There is also shown an agent 506, and an environment 508 comprising a representation 508a of an electrical circuit. The system 500 is an example of a system implemented as one or more computer program modules. The one or more computer program modules can be run either on a single machine or across multiple machines in the same or different locations.

Figure 6:
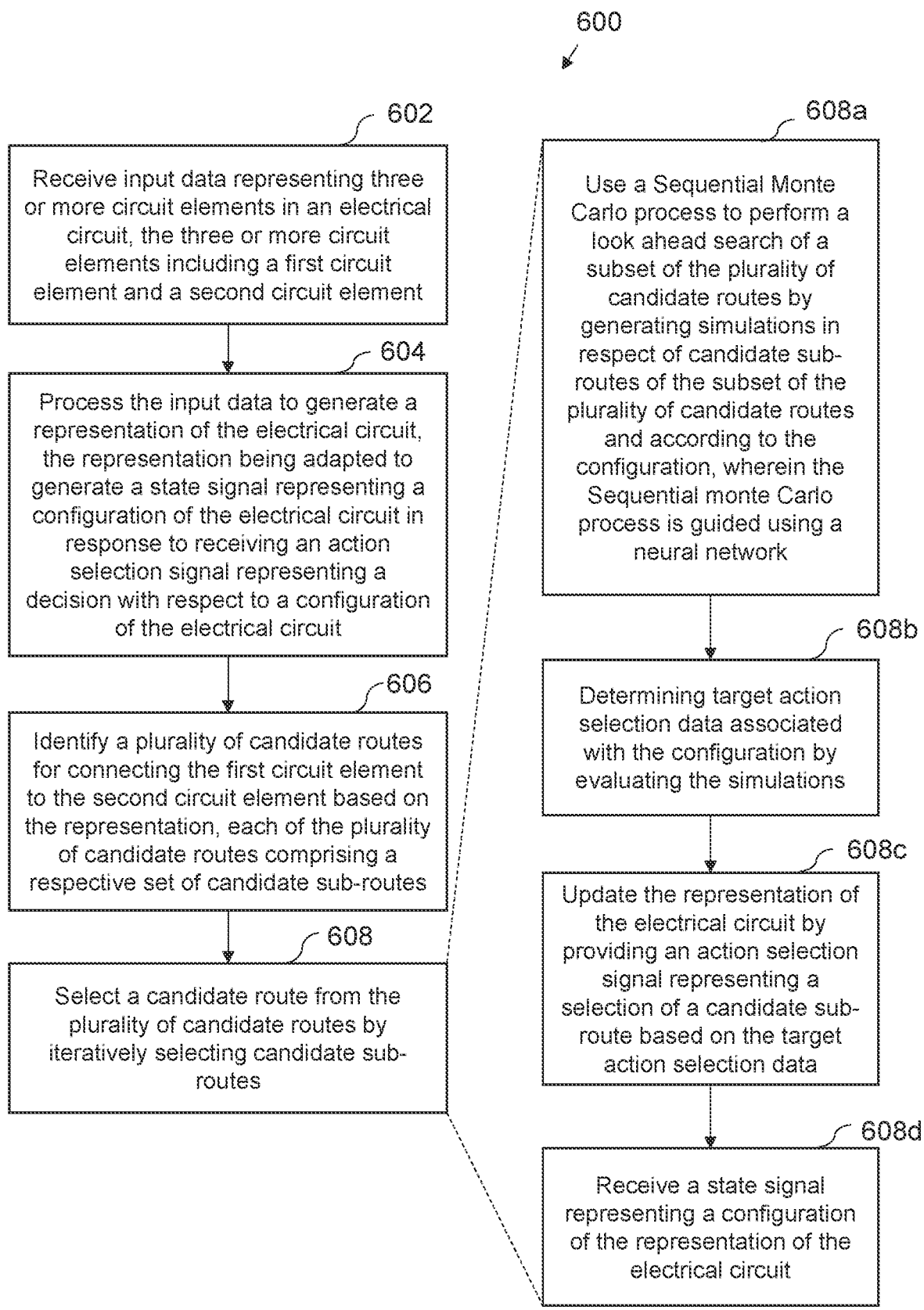
FIG. 6 is a flow diagram of a computer implemented method for designing an electrical circuit according to an example.

The system 500 is adapted to perform a method, examples of which will be described with respect to FIGS. 6 to 8. FIG. 6 shows a flow chart 602 to 608d of the steps of the method 600 which will be discussed in detail with reference to FIG. 7. At a first step the method 600 comprises receiving input data 516. The input data 516 represents three or more circuit elements in an electrical circuit. The three or more circuit elements include a first circuit element and a second circuit element. The input data 516 may also specify a connection to be made between the first circuit element and the second circuit element. The input data 516 is received at the interface 514 of the system 500. The interface 514 of the system 500 comprises any suitable combination of interface hardware for receiving the input data 516. For example, the interface 514 may comprise a network interface to receive the input data 516 over a local or wide area network, an interface with an external storage medium, or a user interface such that a user of the system might specify three or more circuit elements in an electrical circuit to be designed. In some implementations, the interface 514 may also be used to provide output data 522 representing the designed electrical circuit which is to be manufactured. The output data 522 may be generated by the processing engine 512 and/or the interface 514.

The present example is concerned with the design of a printed circuit board (PCB). However, it will be appreciated that the methods and systems described herein will be equally applicable to the design of other electrical circuits such as FPGAs, CPUs, GPU, ASICs, and other suitable electrical circuits. The circuit elements include any topological features of the printed circuit board, including components which are to be placed on the printed circuit board and features such as holes, vias, and other obstacles. The components include both electrical components which are to be connected and any other components which will affect the topology and routing of the connections on the PCB. A circuit element may include more than one electrical component, for example, a circuit element may represent a group of interconnected components. The input data 516 is a .dsn file representing circuit boards. These .dsn files comprise indications of circuit elements, their positions, and in some cases indicate connections to be made between circuit elements. Similarly, output data 522 may be in the form of a .dsn file representing a circuit board with the connections between circuit elements having been selected. The output data 522 may be received by manufacturing equipment 524 and used to produce an electrical circuit according to the output data 522.

Figure 7:
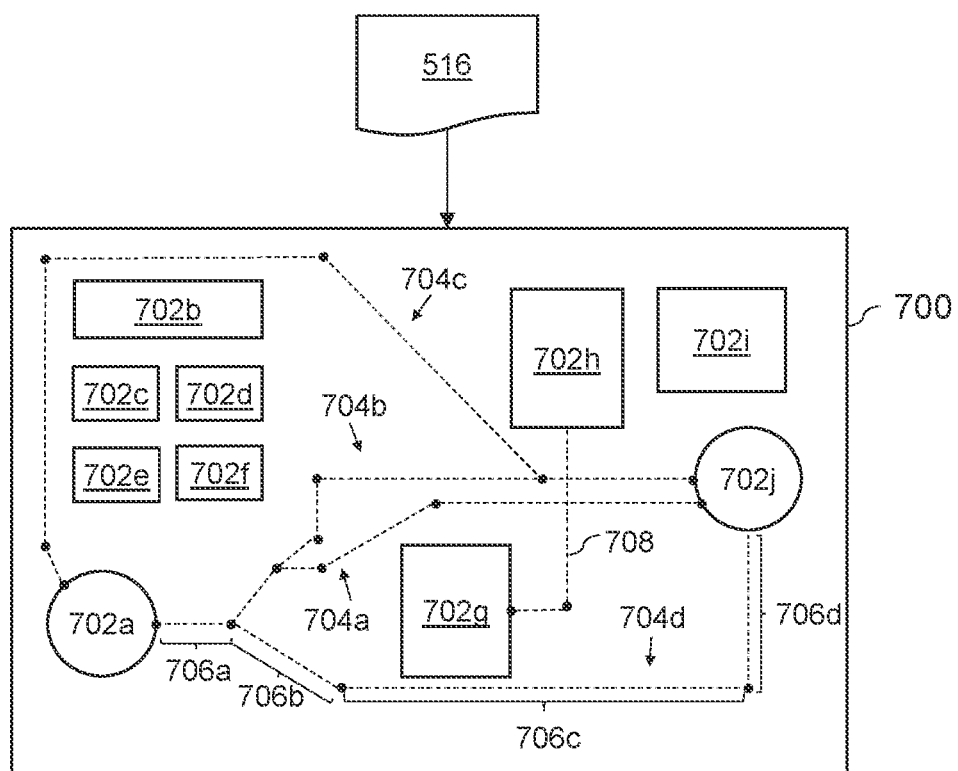
FIG. 7 is a schematic illustration of a representation of an electrical circuit according to an example.

The input data 516 is processed by the processing engine 512 to generate a representation 700 of the electrical circuit, shown in FIG. 7, including representations of the three or more circuit elements 702a to 702j. The circuit elements 702a to 702j are each located at one or more positions at which connections can be made. In the present example, the input data 516 does not indicate any connections that are already determined in the electrical circuit and so no connections are shown in the representation 700. However, in some examples, the input data 516 may indicate one or more connections between circuit elements which have already been determined. In these cases, the representation 700 would include the determined connections.

The representation 700 of the electrical circuit is updated by providing an action selection signal 518 representing a decision with respect to the configuration of the electrical circuit, specifically a decision with respect to a connection between circuit elements in the electrical circuit. In response to the received action selection signal 518, the representation 700 is updated and is adapted to generate a state signal 520 representing a configuration of the electrical circuit. In this way, the representation 700 is used to maintain an up-to-date configuration of the electrical circuit as the electrical circuit is being designed.

The method 600 includes identifying a plurality of candidate routes 704a to 704d for connecting the first circuit element 702a to the second circuit element 702j. The plurality of candidate routes 704a to 704d each comprise a respective set of the candidate sub-routes 706a to 706d. Only one set of candidate sub-routes 706a to 706d for a particular candidate route 704d are labelled in FIG. 7 for simplicity. An example of a process for identifying candidate routes 704a to 704d will be described below with reference to FIGS. 8 to 11. The candidate sub-routes 706a to 706d each comprise at least two points in the representation 700 of the electrical circuit. In the example shown in FIG. 7 each set of candidate sub-routes of the candidate routes 704a to 704d comprises a plurality of candidate sub-routes. However, it will be appreciated that a set of candidate sub-routes may comprise any suitable number of candidate sub routes including, for example, one candidate sub-route connecting the first circuit element 702a to the second circuit element 702j.

Once the plurality of candidate routes 704a to 704d have been identified, the method 600 involves selecting a candidate route from the plurality of candidate routes 704a to 704d. The candidate route is selected by iteratively selecting candidate sub-routes. The process for selecting a candidate route which is performed iteratively comprises receiving a state signal 520 representing a configuration of the representation 700 of the electrical circuit. In a first instance, this configuration includes the position of each of the circuit elements 702a to 702j with respect to the circuit board, but with no connections made. A Sequential Monte Carlo process is then used to perform a look ahead search of a subset of the plurality of candidate routes by generating simulations in respect of candidate sub-routes of the subset of the plurality of candidate routes. The subset of the plurality of candidate routes 704a to 704d which are searched is dependent on the configuration of the representation 700. For example, if the configuration of the representation 700 includes a specified sub-route 706a then the subset of the plurality of candidate routes 704a to 704d which are searched, includes only candidate routes 704a, 704b, 704d which comprise the specified sub-route 706a. Alternatively, if a connection has already been specified between two further circuit elements 702h and 702g, this may limit the candidate routes, because it is not possible to cross wiring routes in the electrical circuit. If there are no prior connections in the electrical circuit, the look ahead search may include all of the plurality of candidate sub-routes 704a to 704d. It will be appreciated that some of the plurality of candidate routes 704a to 704d may be excluded from the look ahead search based on the basis of other criteria.

The look ahead search is used to determine target action selection data associated with the configuration of the representation 700. The target action selection data is determined by evaluating the simulations which are generated as part of the look ahead search. The simulations are evaluated to determine how effective they are at determining routing connections in the electrical circuit. Evaluating the simulations may include determining characteristics such as a predicted expected reward for each of the simulations, an entropy of each of the simulations, and/or by assessing characteristics of the simulations with respect to one or more optimization criterion for selecting routing connections in the electrical circuit, e.g. length of routing, number of turns, number of vias, and so forth. The target action selection data may be determined based on the comparative efficacy of the simulations, for example, simulations which are more effective at seeking to achieve the one or more optimization criterion may be ranked as a more desired solution compared to other of the simulations in the target action selection data. In some cases, these characteristics of the simulations may additionally, or alternatively, be compared to one or more reference values and/or threshold values to determine the target action selection data.

As described in relation to FIGS. 1 to 3, the look ahead search is guided by the neural network 502. In the present example, the characteristics of the simulations which are evaluated to determine the target action selection data are the weight values $W^1, W^2, \ldots W^M$ of the simulations. The weight values $W^1, W^2, \ldots W^M$ of the simulations may be determined based on the rewards at each configuration $S_t^m$ of a respective simulation.

Once a simulation represents a candidate route which fully connects the first circuit element 702a to the second circuit element 702j, the respective weight value $H^m$ may also be updated based on an evaluation of characteristics of the candidate route related to the design criteria of the electrical circuit. This may include criteria such as, the total length of the candidate route, the number of changes in direction in the candidate route, the isolation between the candidate route and other connections and/or electrical components in the electrical circuit.

A selection of a candidate sub-route 706a is then performed based on the target action selection data. The representation 700 of the electrical circuit is updated by providing the representation 700 with an action selection signal representing the selection of the candidate sub-route 706a. The target action selection data is then stored and/or used to train the neural network 502. It is to be understood that the steps involved in the method 600 are performed in any suitable order, for example the state signal may be received after the representation 700 is updated by providing an action selection signal.

By iteratively applying the Sequential Monte Carlo process to select candidate sub-routes 706a to 706d, the system 500 converges on promising candidate routes connecting the first 702a and second 702j circuit elements without having to use brute force techniques to evaluate and compare all possible routes between the first 702a and second 702j circuit elements.

The selection of candidate sub-routes 706a to 706d may be bidirectional such that candidate sub routes 706a to 706d are selected from either of the first circuit element 702a and the second circuit element 702j. For example, a first candidate sub-route 706a, starting at the first circuit element 702a, may be selected using the Sequential Monte Carlo process as described above. A second candidate route 706d, starting at the second circuit element 702j, may then be selected using the Sequential Monte Carlo process as described above. This process is then repeated to select a third 706b, and fourth 706c candidate sub-route.

Referring briefly again to FIG. 5, receiving a state signal 520 before performing the next iteration of the Sequential Monte Carlo process means that the selection of each candidate sub-route 706a to 706d is dependent on a current configuration of the representation 700 of the electrical circuit. Where the input data 516 comprises indications of a plurality of target connections between circuit elements 702a to 702j, the method 600 may comprise selecting candidate sub-routes corresponding to the plurality of indications one at a time. In this case, it is beneficial to select the candidate sub-routes for connecting the first circuit element 702a to the second circuit element 702j after a state signal is received. When selecting candidate sub-routes from the first circuit element 702a to the second circuit element 702j, the selection of a candidate sub-route 708 between a third 702h and a fourth 702g circuit element may affect the selection of candidate sub-routes between the first 702a and second 702j circuit elements, and vice versa. As the representation 700 of the electrical circuit evolves, a candidate sub-route which may previously have been the most likely to be selected, may no longer be the most likely candidate sub-route.

Selecting the candidate route 704a also involves storing the target action selection data in association with the configuration of the representation 700 of the electrical circuit for each iteration. As candidate sub-routes 706a to 706d are selected the neural network 502 may be trained using the target action selection data. This allows future look ahead searches used to select each subsequent candidate sub-route 706a to 706d to be guided by an updated neural network 502, thereby increasing the effectiveness of the look ahead search.

In many applications of the present method 600, the number of candidate routes in the plurality of candidate routes 704a to 704d may be large. Consequently, the Sequential Monte Carlo process used to search the plurality of candidate routes allows an efficient search to be performed while also maintaining a lower memory usage than if an MCTS process was used to perform the look ahead search. Further the memory usage is also more predictable when compared to MCTS methods. When implementing Sequential Monte Carlo processes, as described herein, a finite set of simulations are stored in memory which is independent on the size and/or complexity of the specified problem. Whereas, when implementing MCTS methods, the search tree grows with the size and/or complexity of the specified problem.

A selected candidate route 704d may be evaluated and the neural network 502 updated based on this evaluation. The selected candidate route is associated with a set of characteristics which are evaluated. The characteristics relate to design criteria of the electrical circuit, including, for example: isolation between electrical components, total length of the selected candidate route, and number of changes in direction of the selected candidate route, including the number of vias and turns included in the selected candidate route 704d. Vias and unnecessary turns may decrease the reliability of manufacturing a given circuit board and increase the potential fault points with the electrical circuit, so the inclusion of these features should be minimized where possible. A candidate route 704a to 704d is said to be selected when the candidate sub-routes 706a to 706d comprised in the candidate route connect the first circuit element 702a to the second circuit element 702j.

A global evaluation of the representation of the electrical circuit may be used to train the neural network 502. Once a candidate route has been selected, and the representation 700 of the electrical circuit may be evaluated and the neural network 502 updated based on this evaluation. In examples where a plurality of candidate routes are being simultaneously selected by selecting individual candidate sub-routes belonging to the plurality of candidate routes, the final configuration of the representation 700 of the electrical circuit may be evaluated based on criteria such as a length of the selected plurality of candidate routes; a number of changes in direction in the selected candidate route; a measure of a density of connections in the electrical circuit; and an amount of connections which are on a preferred layer.

In an example, the processing engine 512 evaluates the selected candidate route 704d by comparing the set of characteristics of the selected candidate route 704d with characteristics associated with alternative candidate routes from the plurality of candidate routes 704a to 704d. This allows the neural network 502 to be updated such that when used by the processing engine 512 to select further connections between circuit elements of the three or more circuit elements 702a to 702j the look ahead searches are more accurate.

A Sequential Monte Carlo process relating to present example of circuit design will now be described with reference to FIG. 8. The Sequential Monte Carlo process performed by the processing engine 512 comprises generating a plurality of simulations, m=1 to m=M, each comprising a respective sequence of configurations $S_t^m$ and candidate sub-routes $a_t^m$. For example, a first simulation, m=1, comprises the sequence $[S_0, a_1^1, S_1^1, a_2^1, S_2^1 \ldots a_T^1, S_T^1]$. Each respective sequence starts at a first configuration $S_0$ of the representation 700 of the electrical circuit and ends in a second configuration $S_T^1$ of the representation 700 of the electrical circuit. In other words, the candidate sub-routes $a_t^m$ which are selected by the processing engine 512 using the neural network 502 by providing it with state signals 804 each representing a configuration of the representation of the electrical circuit.

For example, the state signal 804 may comprise a plurality of variables $\{x_1 \ldots x_n\}$ representing positions of the three or more circuit elements 702a to 702j and connections between them. The plurality of variables $\{x_1 \ldots x_n\}$ may include a plurality of variable types including vectors and scalar values in any suitable data type including, but not exclusively, arrays, strings, integers, and the like. Alternatively, or additionally, the state signal 804 may comprise any other data representative of a state of the representation 700 including images and linked lists. For each state $S_t^m$ the neural network 502 is used to determine a prior distribution $\overline{a_t^m}$ which in this case is a distribution over available candidate sub-routes $a_t^m$. The candidate sub-routes are then selected for the plurality of simulations based on these distributions $\overline{a_t^m}$. At each configuration $S_t^m$ the processing engine 512 updates a weight value $W^m$ associated with the respective simulation. As described above, these weight values $W^1, W^2, \ldots, W^M$ are dependent on at least a reward, or an expected predicted reward, associated with each configuration $S_t^m$.

Data indicative of the plurality of simulations is stored in the buffer 510 as the plurality of simulations are generated. The processing engine 512 determines the target action selection data 802 by evaluating the weight values $W^1, W^2, \ldots, W^M$ associated with the simulations.

As discussed above, the weight values $W^1, W^2, \ldots, W^M$ may be updated based on rewards at each configuration $S_t^m$. In this case, the rewards may be determined based on specified design criteria, including any of: a length of the route between first circuit element 702a and second circuit element 702b, a number of turns in the route, a number of vias included in the route, and the proximity of the route to other circuit elements and wires. Measures relating to these criteria and others may be calculated by the processing engine 512 for each simulation and used to update the respective weight values $W^1, W^2, \ldots, W^M$.

As is also described above, in some cases these weight values $W^1, W^2, \ldots, W^M$ may also be dependent on entropy values associated with each simulation. The entropy values are dependent on the selected candidate sub-routes which are comprised in the sequences of configurations and candidate sub-routes of the simulations. The distributions $\overline{a_t^m}$ used to select the respective candidate sub-routes are used by the processing engine 512 to determine the entropy values used to update the weight values $W^1, W^2, \ldots, W^M$.

It will be appreciated that other features relating to the method of using a Sequential Monte Carlo process to perform a look ahead search described with reference to FIGS. 1 to 3, which have not been explicitly mentioned in the example of circuit design, are applicable. For example, monitoring and redistributing the simulations while they are being generated may also be performed by the processing engine 512 in this specific example of circuit design.

Figure 8:
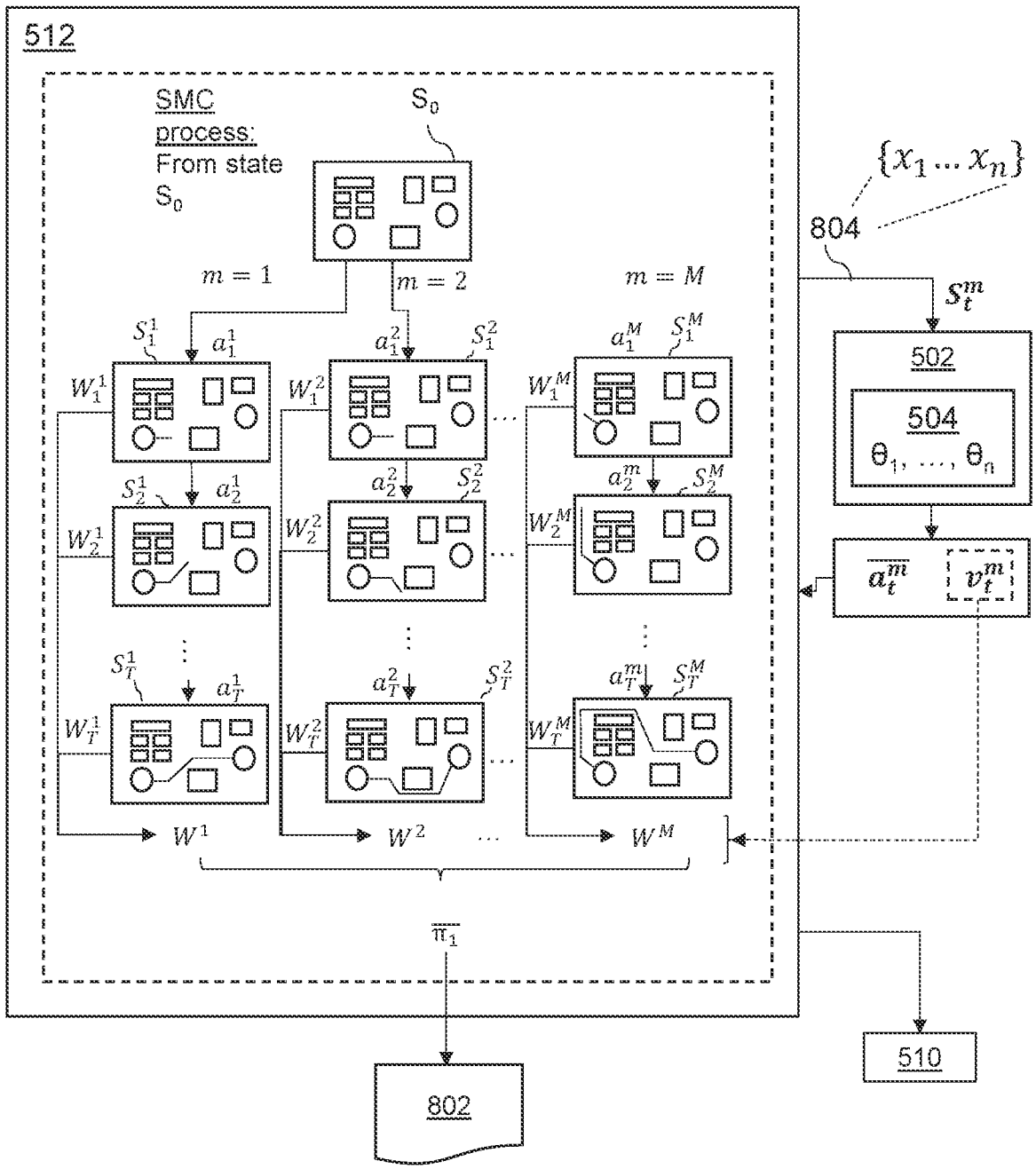
FIG. 8 is a schematic illustration of a Sequential Monte Carlo process for evaluating candidate routes according to an example.
Figure 9:
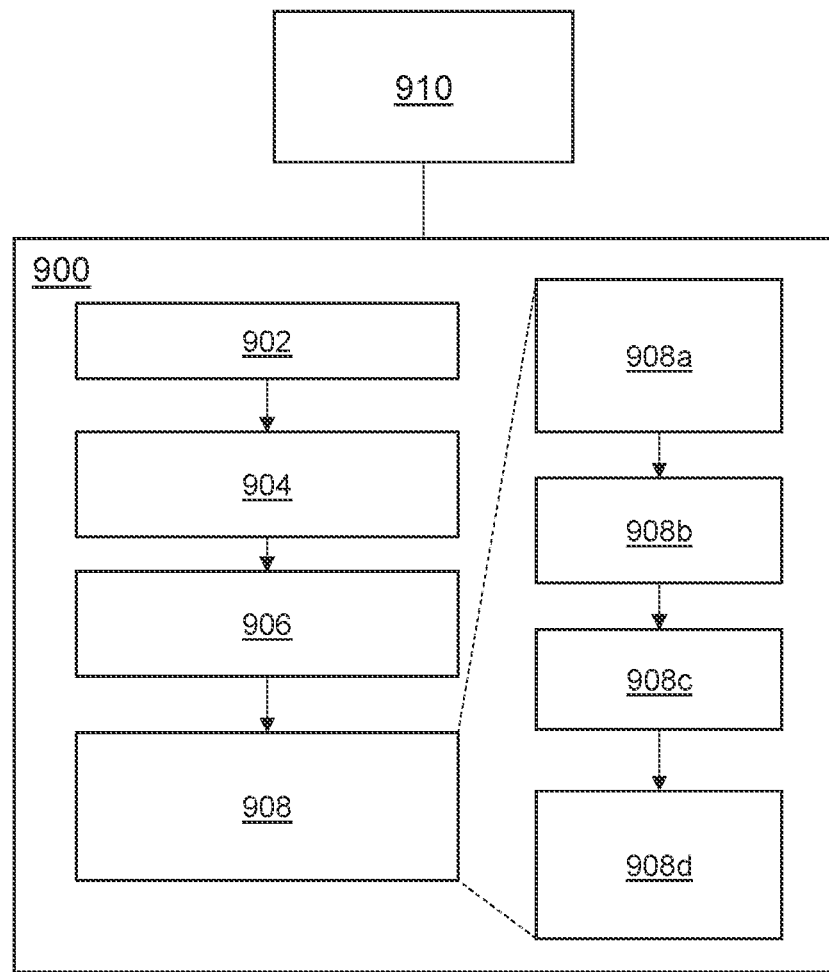
FIG. 9 is a schematic illustration of a non-transitory computer-readable storage medium comprising computer-readable instructions according to an example.

FIG. 9 shows a non-transitory computer-readable storage medium 900 comprising computer-readable instructions 902 to 908d which, when executed by at least one processor 910, cause the at least one processor 910 to perform the method 600 as described above in relation to FIGS. 5 to 8. In FIG. 9, the blocks 902 to 908d shown correspond to the blocks 602 to 608d shown in FIG. 6 where the suffix corresponds to the same steps. In other words, block 602 of the flow chart in FIG. 6 corresponds to the block 902 in FIG. 9, block 604 corresponds to block 904 and so on.

iii. Topology Driven Search

While the method 600 described with reference to FIGS. 6 to 8 provides a memory and computationally efficient method of designing circuits, correctly identifying and reducing the number of candidate routes to be searched can further reduce the memory and computational requirements for designing circuits.

Figure 10:
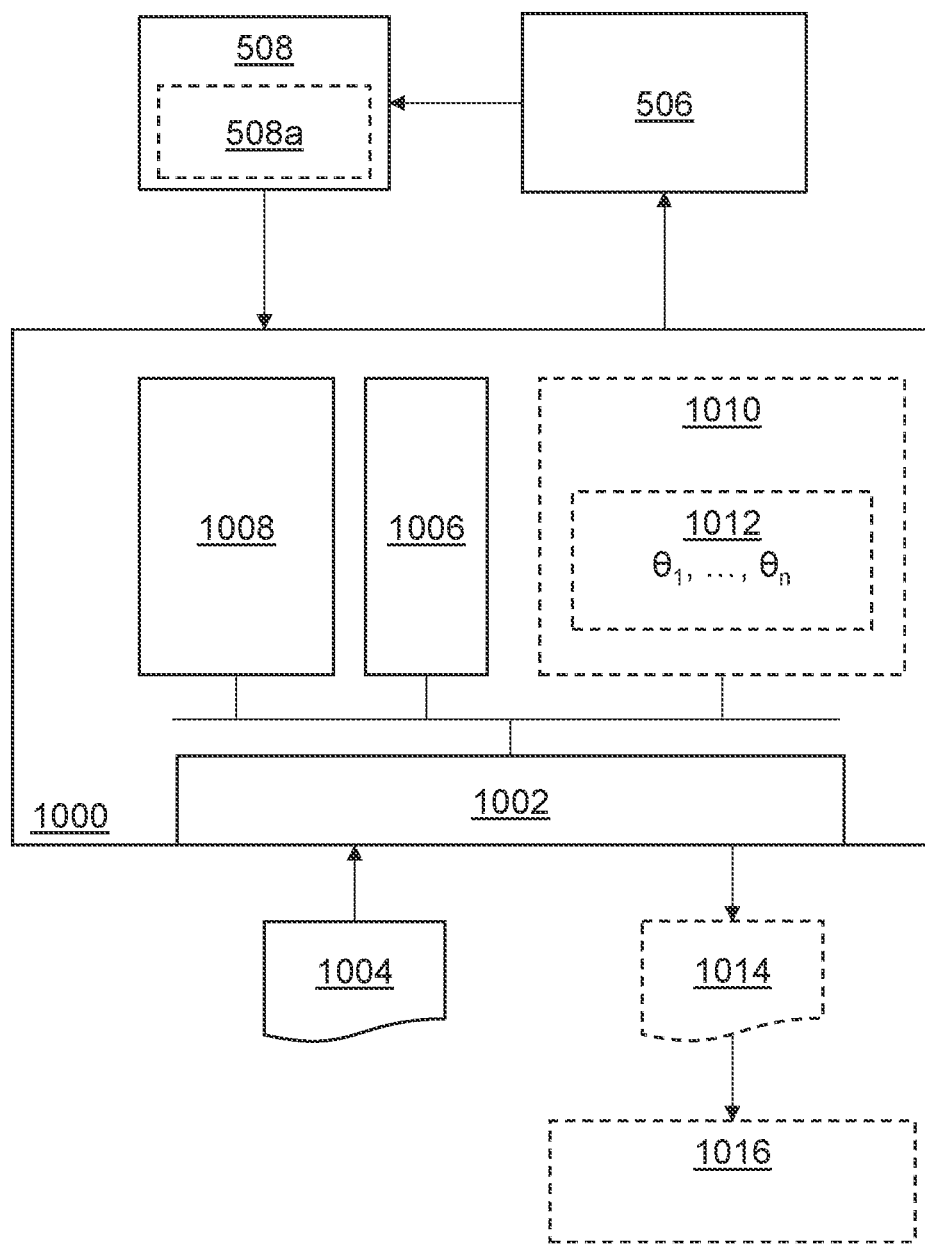
FIG. 10 is a schematic illustration of a system for designing an electrical circuit according to an example.
Figure 11:
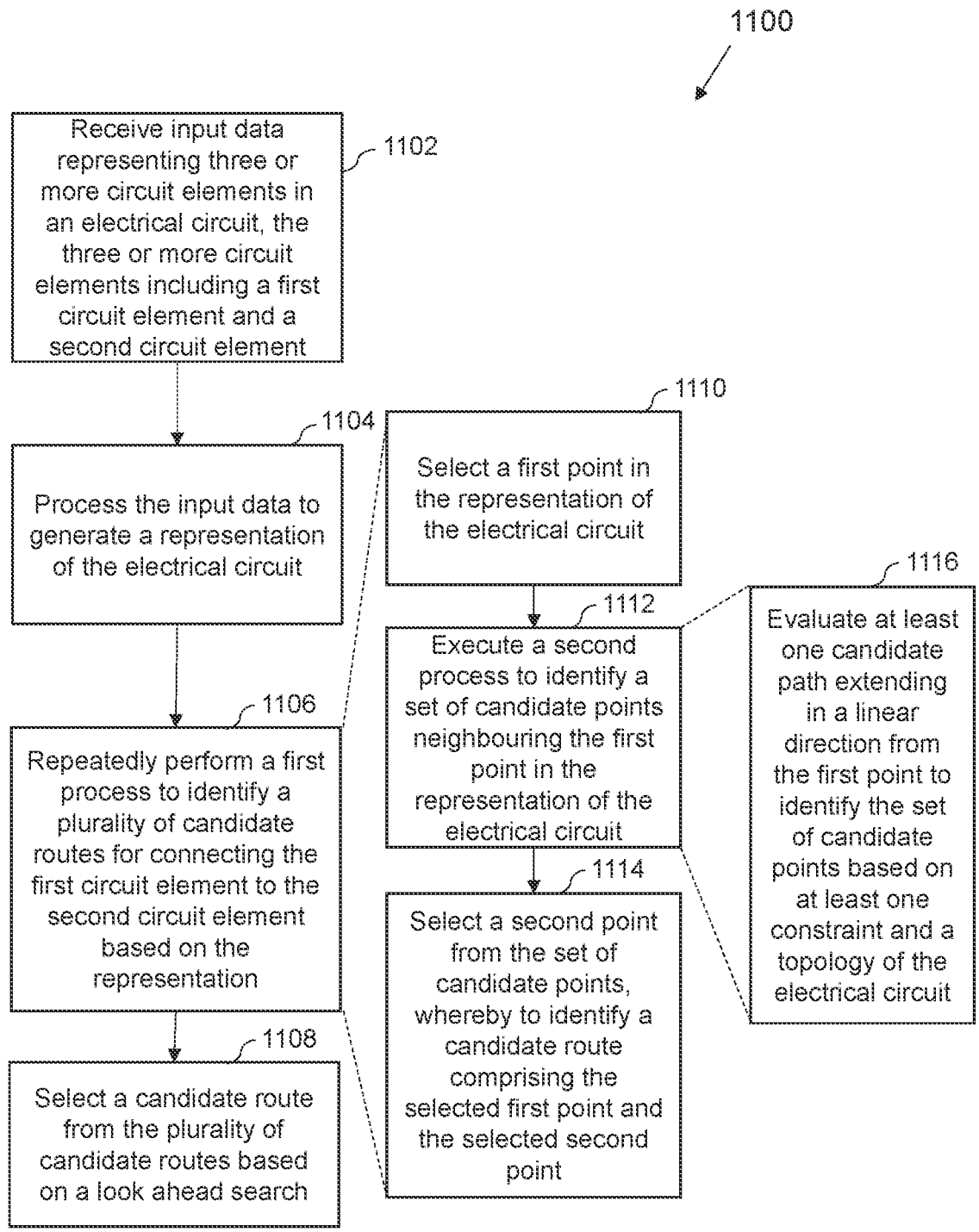
FIG. 11 is a flow diagram of a computer implemented method of designing an electrical circuit according to an example.
Figure 12:
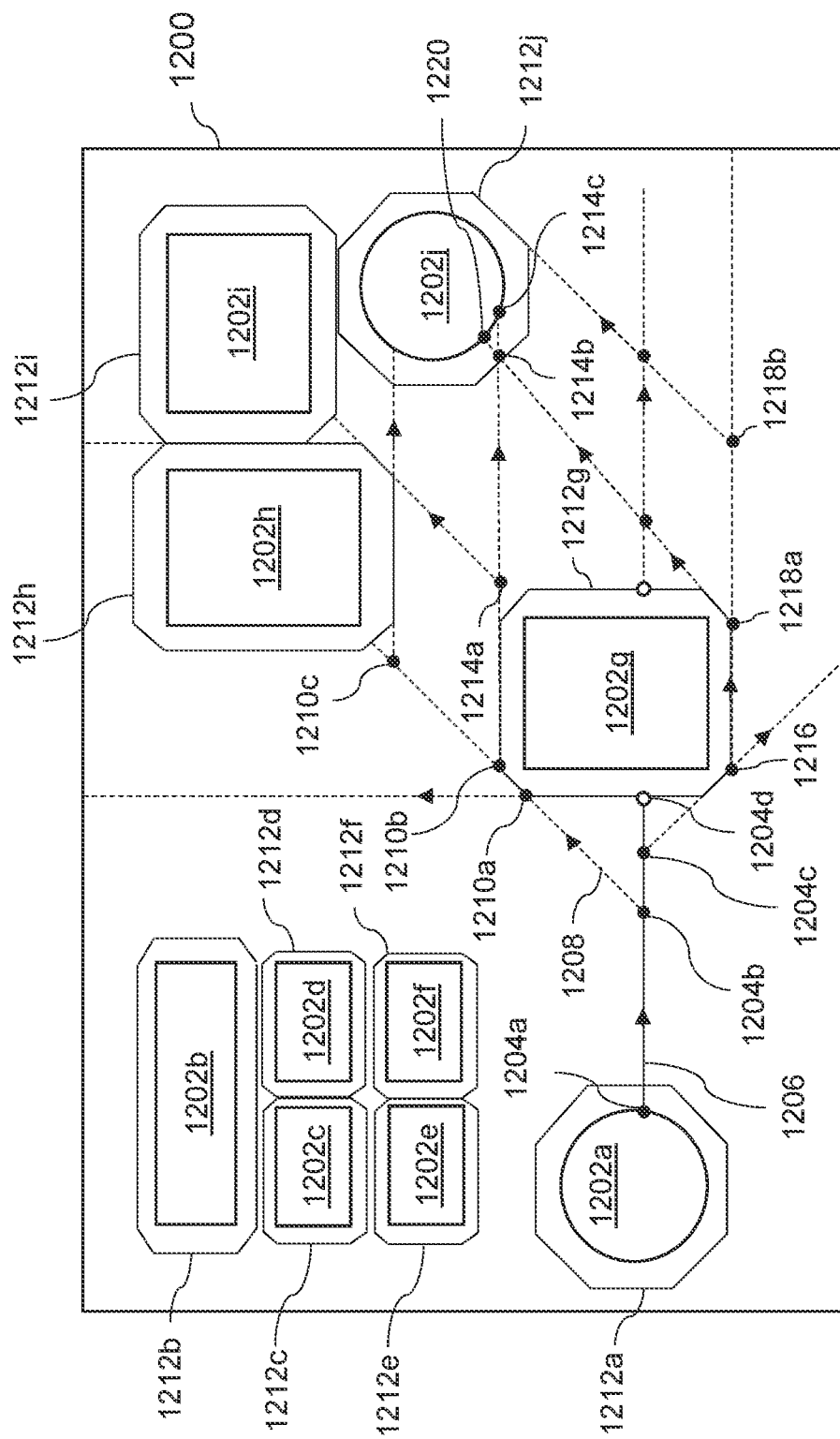
FIG. 12 is a schematic illustration of a representation of an electrical circuit according to an example.

In this respect, an application specific machine learning system 1000 for designing electrical circuits is provided as shown in FIG. 10. The system 1000 comprises an interface 1002, for receiving input data 1004, and in some implementations providing output data 1014 a buffer 1006, a processing engine 1008, and in some implementations a neural network 1010 having a plurality of network parameter values 1012. There is also shown an agent 506, and an environment 508 comprising a representation 508a of an electrical circuit. The system 1000 is an example of a system 1000 implemented as one or more computer program modules. The one or more computer program modules can be run either on a single machine or across multiple machines in the same or different locations. A method 1100, shown in the flow chart 1102 to 1116 of FIG. 11, is implemented by the system 1000 and will now be described with respect to a representation 1200 of the electrical circuit shown in FIG. 12. The representation 1200 shown in FIG. 12 is similar to the representation 700 shown in FIG. 7 but will be used to illustrate a particular process of identifying candidate routes in the representation 1200. Similar to the method 600 previously described, the present method 1100 comprises receiving input data 1004 at an interface 1002 representing three or more circuit elements 1202a to 1202j in an electrical circuit including a first 1202a and a second 1202j circuit element. The input data 1004 may comprise an indication of a connection to be made between the first circuit element 1202a and the second circuit element 1202j. This input data 1004 is processed by a processing engine 1008 to generate a representation 1200 of the electrical circuit.

The method 1100 then includes using the processing engine 1008 to identify a plurality of candidate routes for connecting the first circuit element 1202a to the second circuit element 1202j and selecting a candidate route from the plurality of candidate routes based on a look ahead search. After selecting the candidate route from the plurality of candidate routes, output data 1014 representing the electrical circuit to be manufactured may be generated by the processing engine 1008 and output by the interface 1014 to manufacturing equipment 1016. The manufacturing equipment 1016 may be local or remote to the system 1000 and used to produce electrical circuits. The output data 1014 may be in a suitable file format for being processed and/or used by manufacturing equipment 1016 to manufacture the electrical circuit based on the output data 1014.

Identifying the plurality of candidate routes comprises repeatedly performing a first process 1110 to 1114, wherein the candidate routes are identified based on the representation 1200.

The first process 1110 to 1114 comprises selecting a first point 1204a in the representation 1200 of the electrical circuit. A second process 1116 is then executed to identify a set of candidate points 1204b to 1204d neighboring the first point 1204a in the representation 1200 of the electrical circuit. Two points may be said to be neighboring if they are within a predetermined distance of one another. A second point 1204b from the set of candidate points 1204b to 1204d is then selected to identify a candidate route comprising the selected first point 1204a and the selected second point 1204b. The candidate route may comprise a plurality of points 1204a, 1204b, 1210b, 1214c in the representation 1200 of the electrical circuit. In this case, the first process 1110 to 1114 may be repeated to select further points of the candidate route to identify the candidate route. This can be seen in FIG. 12 in which a candidate path 1208 extending in a linear direction from the second point 1204b is evaluated to identify a further set of candidate points 1210a to 1210c. A candidate point 1210b of this further set of candidate points is then selected and the first process repeated.

Generally, when identifying a set of candidate points in a given environment for the purposes of finding a route from a first location to a second location, a grid is overlaid on the environment and the coordinates of the grid are the set of candidate points. If such a method is applied when the density of the grid is determined by the precision available at the time of manufacturing electrical circuits, a large number of candidate routes will be identified. Even if it were possible to reduce the density of the grid, there would still be many candidate points which appear to be candidate routes that are in fact not candidates at all due to design constraints of the electrical circuit. Then, when performing a look ahead search to select such a candidate route, there will be inefficiency in the use of computational power to analyze candidate routes which are not viable or undesired due to their characteristics not satisfying certain design criteria, generally referred to herein as topology.

The second process 1116 addresses these otherwise existing inefficiencies and comprises evaluating at least one candidate path 1206 extending in a linear direction from the first point 1204a. The set of candidate points 1204b to 1204d are identified based on at least one constraint and a topology of the electrical circuit. This allows the number of candidate points, and hence candidate routes, to be reduced. This in turn decreases the computational power required to perform the look ahead search to select a candidate route. The set of candidate points which are identified in this may be identified in a substantially continuous domain in which the minimum possible distance between the points is determined by a resolution of the representation rather than by the resolution of a grid or mesh overlaid on the environment. This can provide increased design freedom and the identification of potentially more efficient candidate routes.

Others of the plurality of candidate routes are identified by repeating the first process. For example, a further candidate route may be identified by selecting a same first point 1204a as when identifying the previously described candidate route (comprising points 1204a, 1204b, 1210b, and 1214c). The set of candidate points 1204b to 1204d are identified, and then a different second candidate point 1204c is selected. Each time a set of candidate points is identified, several candidate points may be selected to identify different candidate routes, and the first process 1110 to 1114 may then be repeated from these selected candidate points.

Turning again to the second point 1204b, the at least one constraint which is used to identify the second point 1204b includes an allowed angular range for a change in direction of the candidate path 1206. Depending on the type of electrical circuit and constraints imposed by manufacturing processes, changes in a direction of a route may be constrained to specific angular ranges. For example, one angular constraint may be that a change in direction cannot be larger than 45 degrees. As the connection route cannot intersect other circuit elements 1202g in the electrical circuit, the second point 1204*b* is identified as a candidate point at which a change in direction of 45 degrees can be performed such that a subsequent candidate path 1208 extending linearly from the second point 1204*b* does not intersect the neighboring circuit element 1202*g*. In the present example, there are discrete intervals in the angular range of 0 degrees and 45 degrees; the number of discrete intervals determines the number of candidate points which are identified in the set of candidate points 1204*b* to 1204*d*. In other examples, the allowed angular range may be continuous in which any angle between 0 and 45 degrees can be selected, within a tolerance of manufacture.

It is well known that in the case of PCBs, a conductive path placed on the board often is required to have a minimum spacing between it any other electrical components or conductive paths on the board. This is to prevent noise between conductive paths from affecting the signals transferred between electrical components in the board. Turning to FIG. 12, isolation regions 1212*a* to 1212*j* represent minimum spacings between the circuit elements 1202*a* to 1202*j* and the candidate routes. In the implementation shown in FIG. 12, the second point 1204*b* is identified as a point along the candidate path 1206 at which a change in direction of the candidate path 1206 is feasible without the candidate path traversing the isolation region 1212*g* around the neighboring circuit element 1202*g*.

A point 1204*b* in the set of candidate points 1204*a* to 1204*d* may be identified by determining an intersect between a tangent to the isolation region 1212*g* around at least one neighboring circuit element 1202*g* and the candidate path 1206. The tangent coincides with the following candidate path 1208 which extends from the second point 1204*b*, determined during a second iteration of the first process 1110 to 1114. The isolation region 1212*g* is represented by a polygon having angles which correspond to the allowed angular range for the change in direction. The internal angles of the polygons representing the isolation regions 1212*a* to 1212*j* in the representation 1200 are each 135 degrees which corresponds to 180 degrees minus the allowed angular range of 45 degrees. The tangents to the polygons which are evaluated are tangent to line segments of the polygons. In this way, the number of candidate points in an identified set of candidate points is reduced. Evaluating tangents to line segments of polygons provides a limited number of tangents which are to be analyzed thereby increasing the processing speed for identifying the set of candidate points. The number of tangents which are assessed corresponds to the number of sides of each polygon.

It is to be understood that the isolation regions 1212*a* to 1212*j* shown in FIG. 12 are exemplary, and that the regions may be other than polygons, such as circular, elliptical, etc. For such shapes the tangents may have orientations which differ from the other tangents by an angle that is dependent on allowed angular range for changes in direction of the candidate routes. For example, where the isolation region is represented by a circle and the allowed angular range is 45 degrees, three tangents may be evaluated each differing by a bearing of 45 degrees.

A change in direction of a candidate path may also involve the introduction of a via into the candidate path. For example, where the candidate path 1206 intersects an isolation region 1202*g* around a circuit element 1202*g* a via may be introduced at a candidate point 1204*d* such that the candidate path continues on an alternate side, or layer, of the circuit board. In this case, a tangent to the isolation region may include tangents which are parallel to a line segment of isolation region in the plane of the candidate path 1206 but are also perpendicular to the line segment and hence represent a direction into the circuit board.

In some examples, a large number of candidate points are identified. This may be the case when a plurality of candidate paths, each extending in a respective linear direction, are evaluated as part of the second process 1116. In such a case each of the plurality of candidate paths may extend in a linear direction according to the allowed angular range for changes in direction. In other words, where the allowed angular range is 45 degrees, a total of eight candidate paths may be evaluated from a point 1204*a* each extending in a direction 45 degrees different from adjacent candidate paths of the plurality of candidate paths. As such, ranking methods may be utilized to select a second point 1204*b* when performing the first process 1110 to 1114. Search algorithms such as the A* search algorithm described in "Artificial Intelligence a Modern Approach"—Stuart J Russell; Peter Norvig, Boston Pearson 2018 ISBN 978-0134610993. may be used to rank candidate points to streamline the identification of the candidate routes. After identifying each of the set of candidate points 1204*b* to 1204*d*, the points are ranked. This ranking is determined based on a cost comparison. A total cost of each candidate point 1204*b* to 1204*d* is determined. The total cost for each candidate point 1204*b* to 1204*d* includes a cost from a start of the candidate route 1204*a*, at the first circuit element 1202*a*, to the candidate point 1204*b* to 1204*d*, and a predicted cost from the candidate point 1204*b* to 1204*d* to the end of the candidate route, at the second circuit element 1202*j*. In the present example a cost of a route may be determined based on design criteria. In other words, a cost of a candidate route from a first point 1204*a* to a second point of the candidate points 1204*b* to 1204*d*, is determined based on: the length of the route from the first point 1204*a* to the second point 1204*b* to 1204*d*, and/or a number of changes in direction in the route from the first point 1204*a* to the second point 1204*b* to 1204*d*.

Figure 13:
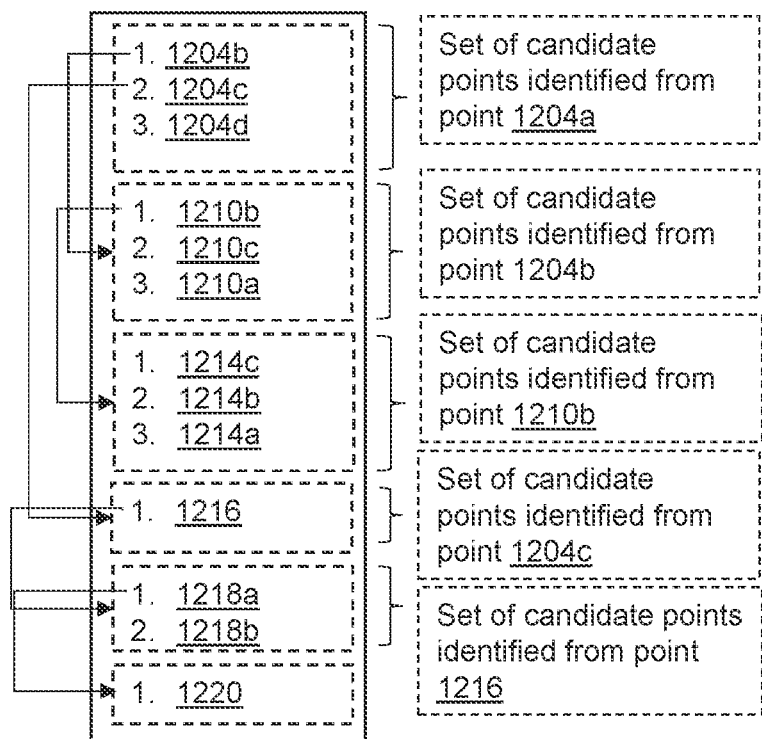
FIG. 13 is a schematic illustration of a process of identifying candidate routes by selecting candidate points.

FIG. 13 shows a list of points that collectively define a candidate route and that have been selected to connect circuit element 1202*a* to 1202*j*. The list shows that, from a first point 1204*a*, a first set of candidate points 1204*b* to 1204*d* has been identified. These are ranked and a second point 1204*b*, which has the highest ranking has been selected. A second set of candidate points 1210*a* to 1210*c* have been identified from this second point 1204*b*. This second set of candidate points 1210*a* to 1210*c* have been ranked and a third candidate point 1210*b* has been selected. This process is repeated as shown in FIG. 13 until a candidate route comprising a sequence of candidate points [1204*a*, 1204*b*, 1210*b*, 1214*c*] is identified.

Another candidate route is identified by selecting a different second candidate point 1204*c* from the first candidate point 1204*a* and proceeding as before. Rather than selecting the highest ranked point 1204*b*, a lower ranked point 1204*c*, is selected. This other candidate route which is identified comprises a different sequence of candidate points [1204*a*, 1204*c*, 1216*a*, 1218*a*, 1220].

Once the plurality of candidate routes has been identified—in this example candidate route defined by points [1204*a*, 1204*b*, 1210*b*, 1214*c*] and candidate route defined by points [1204*a*, 1204*c*, 1216*a*, 1218*a*, 1220]—an actual route is selected based on a look ahead search. In some implementations, the look ahead search involves the use of a Sequential Monte Carlo process, guided by the neural network 1010 as described above with reference to FIGS. 1 to 8.

In some implementations, the identification of candidate routes may be bidirectional. That is to say, the identification of the candidate route may be performed by concurrently or sequentially performing the first process starting from each of the first 1202a and the second 1202j circuit elements. For example, the first process may be performed by selecting, as a first point of the first process 1110 to 1114, a first candidate point 1204a co-located with the first circuit element 1202a. The second candidate point 1204b will then be selected as the selected second point in the first process 1110 to 1114. The first process is then performed, either concurrently or sequentially, by selecting, as a first point of the first process 1110 to 1114, a third candidate point 1214c co-located with second circuit element 1202j. A fourth candidate point 1214a may then be selected as the selected second point of the first process 1110 to 1114. The first process is then repeated from either the second candidate point 1204b or the fourth candidate point 1214a.

Figure 14:
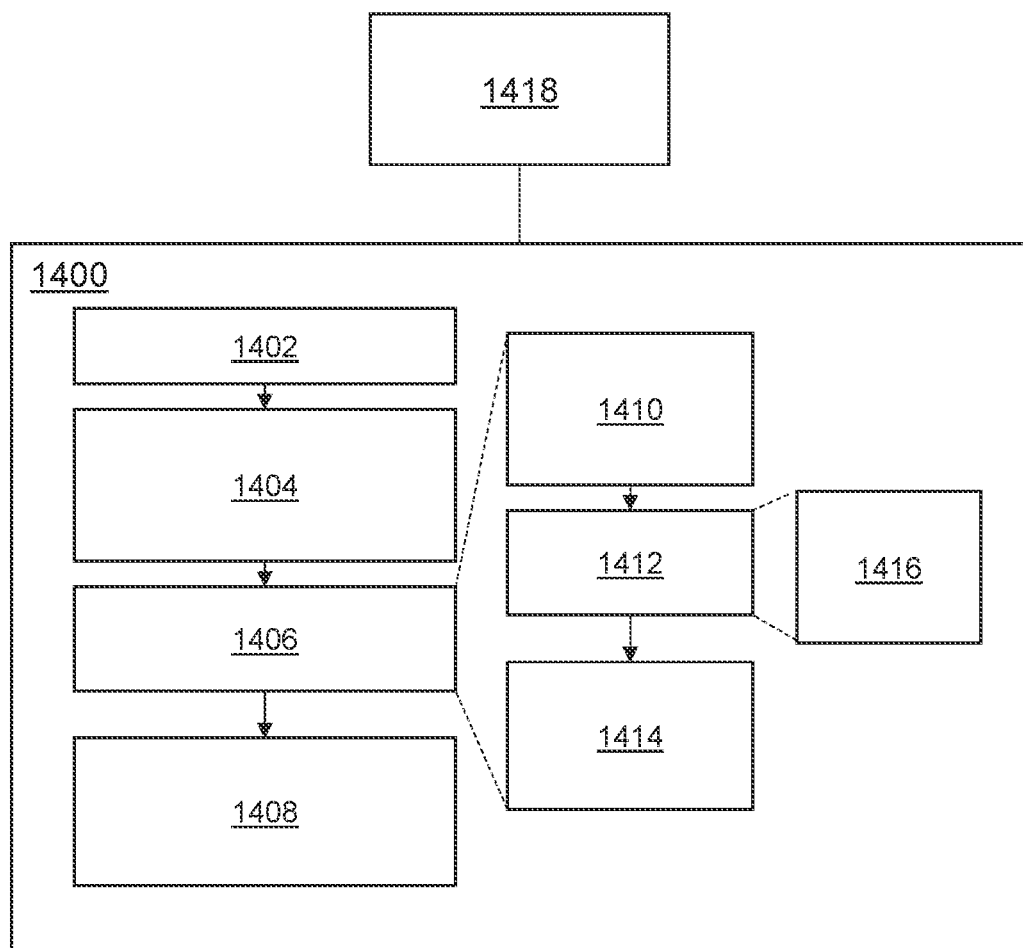
FIG. 14 is a schematic illustration of a non-transitory computer-readable storage medium comprising computer-readable instructions according to an example.

FIG. 14 shows a non-transitory computer-readable storage medium 1400 comprising computer-readable instructions 1402 to 1416 which, when executed by at least one processor 1418, cause the at least one processor 1418 to perform the method 1100 as described above in relation to FIGS. 10 to 13. In FIG. 14, the blocks 1402 to 1416 shown correspond to the blocks 1102 to 1116 shown in FIG. 11 where the suffix corresponds to the same steps. In other words, block 1102 of the flow chart in FIG. 11 corresponds to the block 1402 in FIG. 14, block 1104 corresponds to block 1404 and so on.

iv. Circuit Design Application of Sequential Monte Carlo Process (High Level)

The methods and systems described in relation to FIGS. 1 to 3 may be applied to the domain of electrical circuit design in a different manner than that described above in relation to FIGS. 5 to 13. In the preceding description, Sequential Monte Carlo processes have been used to select candidate routes for connecting a first circuit element to a second circuit elements. In an alternative example described below, a Sequential Monte Carlo process is used to determine the routes by selecting an order in which the routes are to be determined.

As connections in an electrical circuit, such as a PCB, are selected and configured, the topology of the electrical circuit changes, affecting the placement of subsequent connections. Put another way, the order in which connections between circuit elements are determined and/or selected can affect the overall topology of the electrical circuit. In some cases, the selection and configuration of a particular connection early on in the design process may affect other connections which are to be made. For example, the selection of a particular connection between two circuit elements early on in the design process may cause other connections to be longer and/or include a larger number of turns in order to navigate around the particular connection. It would be desirable to determine an order in which elements in the electrical circuit should be connected so that one or more characteristics of the electrical circuit can be optimized to meet some criteria.

Figure 15:
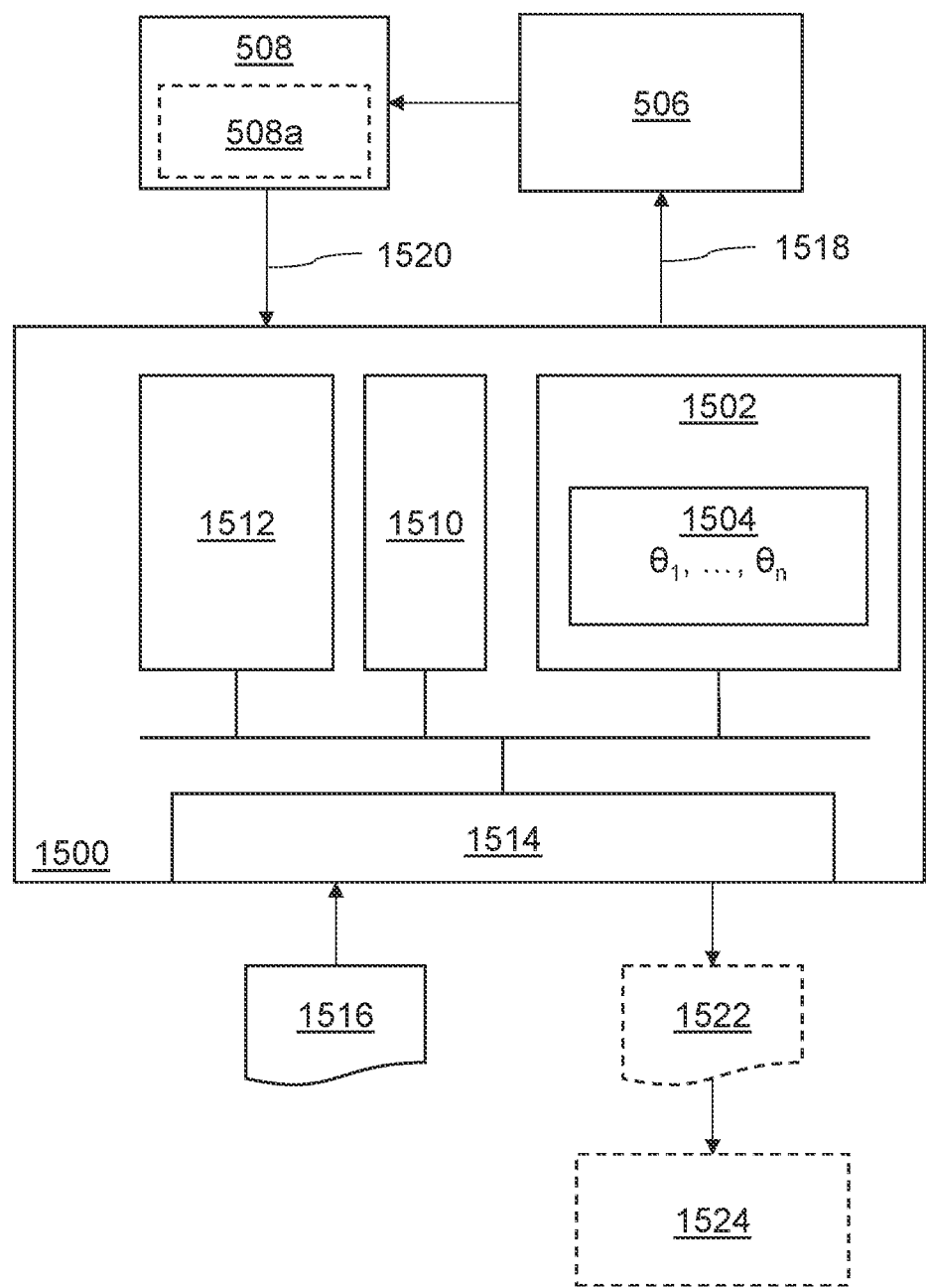
FIG. 15 is a schematic illustration of a machine learning system according to an example.

FIG. 15 shows an application specific machine learning system 1500 for designing electrical circuits which utilizes methods as described in relation to FIGS. 1 to 3. The application specific system 1500 comprises a neural network 1502 having a plurality of network parameter values 1504, a buffer 1510, a processing engine 1512, and an interface 1514, for receiving input data 1516. There is also shown an agent 506, and an environment 508 comprising a representation 508a of an electrical circuit. The system 1500 is an example of a system implemented as one or more computer program modules. The one or more computer program modules can be run either on a single machine or across multiple machines in the same or different locations.

Figure 16:
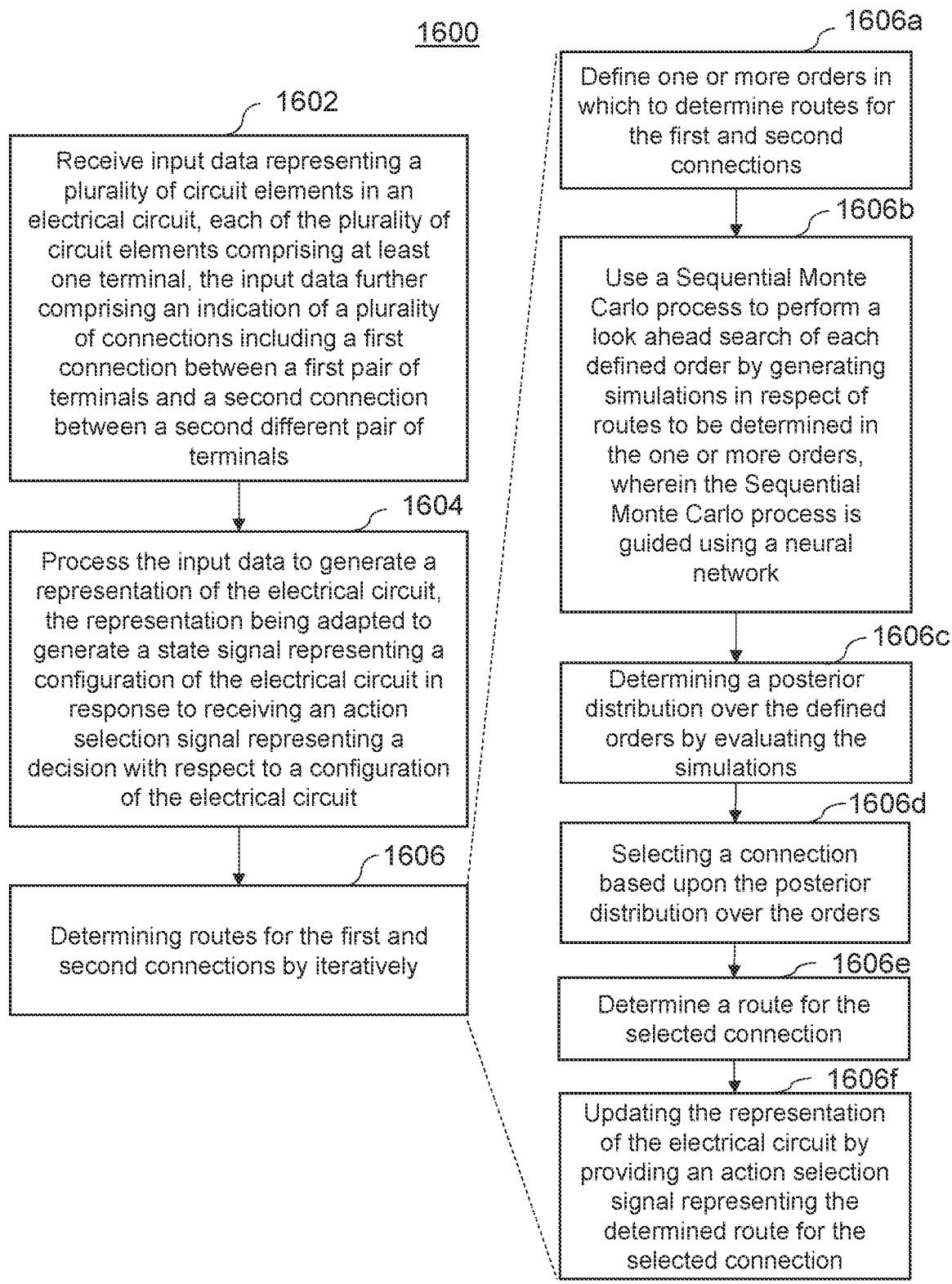
FIG. 16 is a flow diagram of a computer-implemented method according to an example.
Figure 17:
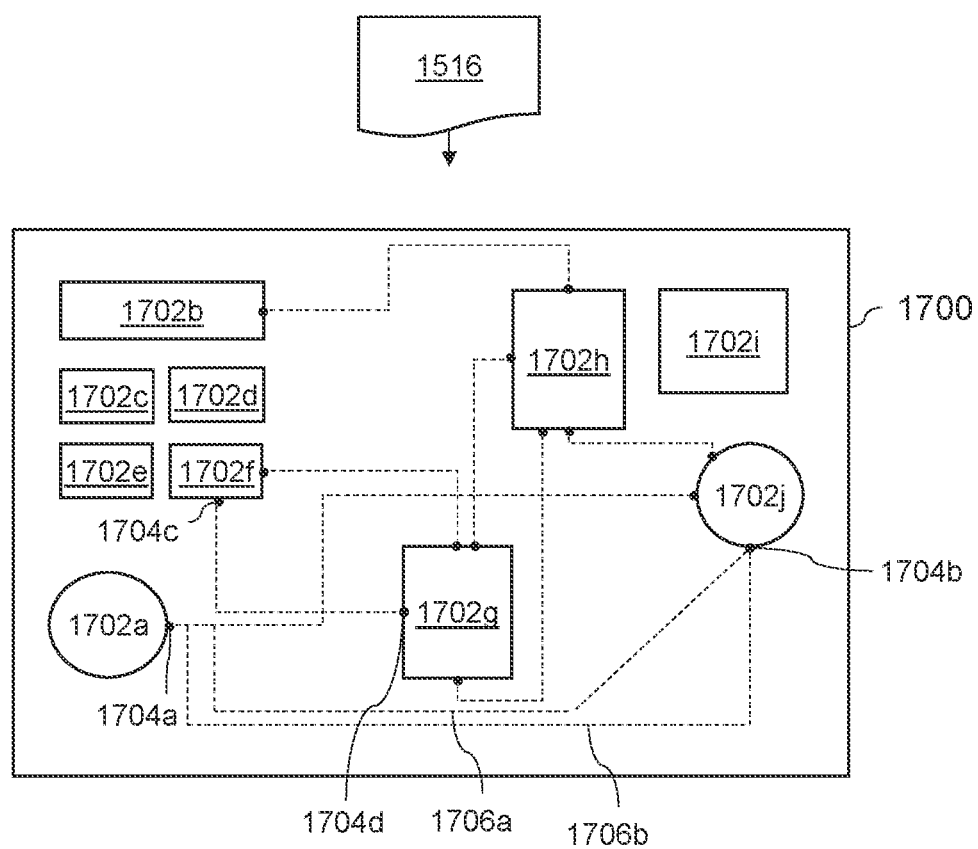
FIG. 17 is a schematic illustration of a representation of an electrical circuit according to an example.
Figure 18:
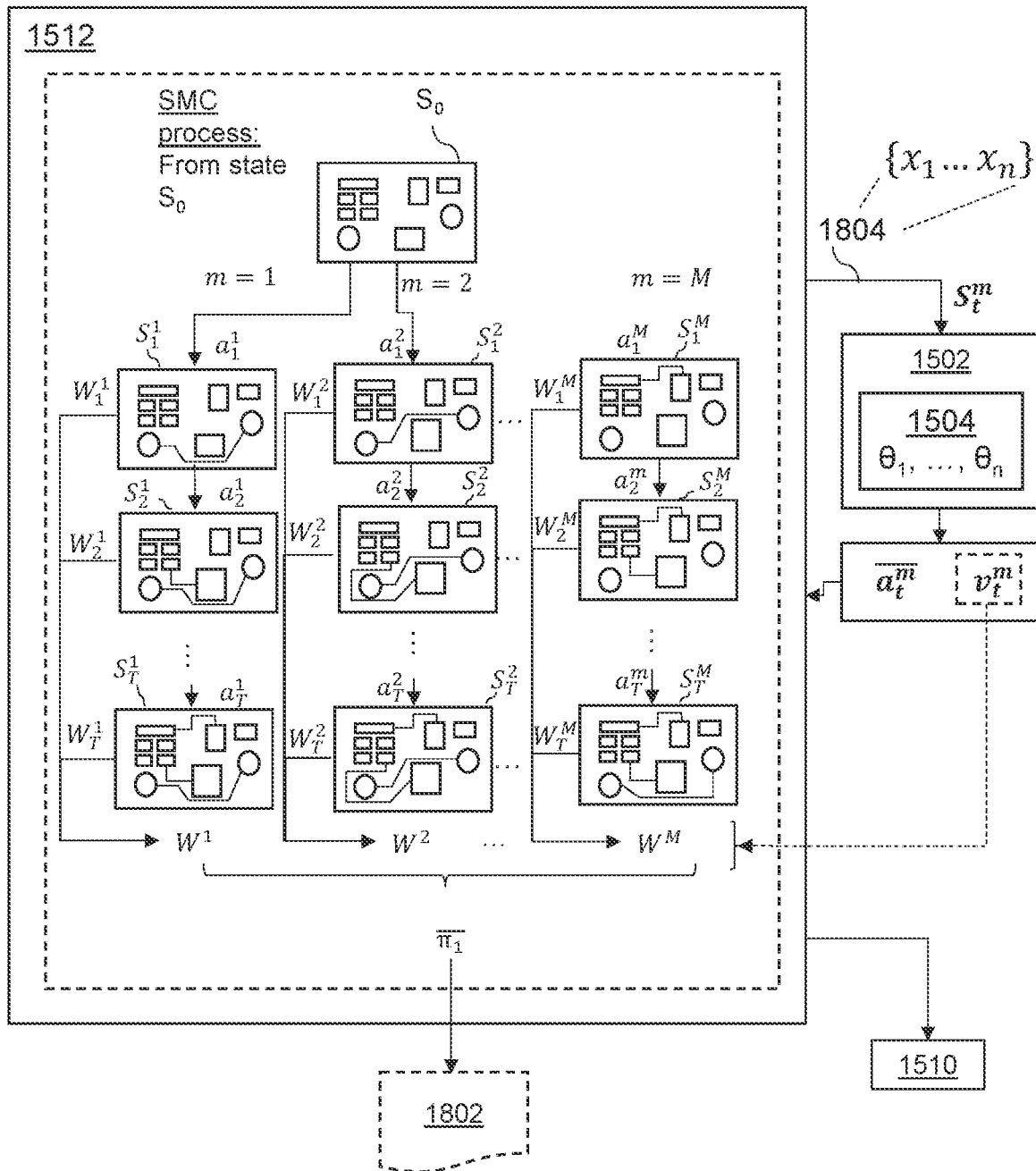
FIG. 18 is a schematic illustration of a Sequential Monte Carlo process according to an example.

The system 1500 is adapted to perform a method, examples of which will be described with respect to FIGS. 16 to 18. FIG. 16 shows a flow chart 1602 to 1606f of the steps of the method 1600. At a first step the method 1600 comprises receiving input data 1616. The input data 1516 represents a plurality of circuit elements in an electrical circuit, each of the plurality of circuit elements comprising at least one terminal. The input data 1516 also comprises an indication of a plurality of connections. The plurality of connections includes a first connection between a first pair of terminals and a second connection between a second different pair of terminals. The first and second pair of terminals may comprise a common terminal. The term terminal refers to any suitable electrical connection point on a circuit element. The input data 1516 is received at the interface 1514 of the system 1500. The interface 1514 of the system 1500 is similar to the interface 514 shown in FIG. 5, and similarly comprises any suitable combination of interface hardware for receiving the input data 1516. In some implementations, the interface 1514 may also be used to provide output data 1522 representing the designed electrical circuit which is to be manufactured. The output data 1522 may be generated by the processing engine 1512 and/or the interface 1514.

In the present example, described with reference to FIGS. 15 to 18, the term circuit element is used to refer to components in the electrical circuit which are to be connected. A circuit element may include more than one electrical component, for example, a circuit element may represent a group of interconnected components. The input data 1516 may be a .dsn file representing a circuit board. These .dsn files comprise indications of circuit elements, their positions, and in the present example, indicates connections to be made between circuit elements, for example the first and second connections. Similarly, output data 1522 may be in the form of a .dsn file representing a circuit board with the connections between circuit elements having been selected and the routes for these connections determined. The output data 1522 may be received by manufacturing equipment 1524 and used to produce an electrical circuit according to the output data 1522.

The input data 1516 is processed by the processing engine 1512 to generate a representation 508a of the electrical circuit. A schematic illustration of this representation 508a is shown in FIG. 17 with a different reference numeral 1700. The representation 1700 includes representations of the plurality of circuit elements 1702a to 1702j. The circuit elements 1702a to 1702j each comprise one or more terminals at which connections can be made. Only a subset of the terminals is labelled in FIG. 17 for clarity. In the present example, the input data 1516 does not indicate any connections the routes for which are already determined in the electrical circuit, and so no solid connections are shown in the representation 1700. However, in some examples, the input data 1516 may indicate one or more connections between circuit elements which have already been determined. In these cases, the representation 1700 would include the determined connections.

The representation 1700 of the electrical circuit is much like the representation 700 described in relation to FIG. 7 and can similarly be updated by providing an action selection signal 1518 representing a decision with respect to the configuration of the electrical circuit. In response to the received action selection signal 1518, the representation 1700 is updated and is adapted to generate a state signal 1520 representing a configuration of the electrical circuit.

The plurality of connections indicated in the input data 1516 are shown in the representation 1700; these connections comprise a first connection, between a first pair of terminals 1704*a* and 1704*b*, and a second connection, between a second pair of terminals 1704*c* and 1704*d*.

The method 1600 includes using the processing engine 1512 to determine routes for the first and second connections by performing an iterative process. The iterative process includes first defining one or more orders in which to determine routes for the first and second connections. The one or more orders which are defined are dependent on a configuration of the representation of the electrical circuit and include connections of the plurality of connections for which routes are yet to be determined. Where the plurality of connections comprises only the first and second connections, a first defined order is to determine the route for the first connection and then to subsequently determine the route for the second connection. A second, alternative, defined order is to first determine the route for the second connection and then to subsequently determine the route for the first connection. The determined orders may specify the order of determining the routes for the first and second connections and any other connections of the plurality of connections. In some examples, there may be only one defined order, for example, where there is only one connection to be made, and/or where there are restrictions which specify that only one order of determining the routes for the connection(s) is valid. Restrictions on the order in which the routes can be determined may include, where a particular connection is of more importance than other connections, and or where a topology of the electrical circuit influences the defining of the one or more orders. However, preferably, there are two or more defined orders, which allows the system to identify a preferred order, of the two or more orders, for determining routes using a look ahead search, as will be described below. When designing electrical circuits there will generally be a plurality of orders in which the routes for two or more connections can be made, and as such, the method 1600 is able to prioritize an order of the plurality of orders based on optimization criteria associated with the electrical circuit.

Once the orders have been defined, the processing engine 1512 uses a Sequential Monte Carlo process to perform a look ahead search of each defined order. The Sequential Monte Carlo process includes generating simulations in respect of routes to be determined in the one or more orders to determine a posterior distribution over the orders. The Sequential Monte Carlo Process is shown in more detail in FIG. 18. The Sequential Monte Carlo process shown in FIG. 18 is similar to that shown in FIGS. 3 and 7 except that the actions $a_t^m$ represent the selection of connections between circuit elements.

The plurality of simulations which are generated each comprise a respective sequence of configurations and connections, each connection having a determined route. The determined routes for each of the connections are determined using any suitable method. In some examples, a random selection of an available route for a given connection is selected. Alternatively, the routes are determined using suitable pathfinding algorithms. There may be more than one simulation per defined order; for example, two simulations may be generated based on the same defined order, but the determined routes for the connections in one of the simulations may be different to the determined routes for the connections in the other of the simulations. The simulations each start at a first configuration $S_0$ of the representation of the electrical circuit and end in a respective second configuration $S_T^1$, $S_T^2$, and $S_T^M$ of the electrical circuit. Although the second configurations $S_T^1$, $S_T^2$, and $S_T^M$ shown in FIG. 18 are each different configurations, it will be understood that in some cases the respective second configurations $S_T^1$, $S_T^2$, and $S_T^M$ may be the same between different simulations.

When generating the simulations, the neural network is used by the processing engine 1512 to guide the selection of connections. Data indicative of the plurality of simulations is stored in the buffer 1510 as the plurality of simulations are generated. As can be seen in FIG. 18 the neural network 1502 is adapted to receive a state signal 1804 representing a configuration of the representation 1700 of the electrical circuit. This state signal 1804 is processed according to the network parameter values in order to generate action selection data. This action selection data comprises a distribution $\overline{a_t^m}$ over possible connections for a given configuration. As previously described, the simulations are evaluated to determine the posterior distribution $\overline{\pi_1}$ over the defined orders. For example, weight values $W^1$ to $W^M$ associated with respective simulations are updated as the simulations are generated. These weights values $W^1$ to $W^M$ are evaluated to determine the posterior distribution $\overline{\pi_1}$ over the defined orders (i.e. orders in which to determine routes for the first and second connections). In examples where there is only one defined order, the distribution $\overline{\pi_1}$ will have only a single value, for the defined order, which will indicate that the one defined order is the only order. If the posterior distribution is normalized and there is only one defined order, that defined order will be associated with a value of 1 in the posterior distribution. Where there are two or more orders, the distribution will have a plurality of values, each value being associated with at least one of the two or more defined orders.

The weight values $W^1$ to $W^M$ may be updated based on rewards at each configuration $S_t^m$ of the respective simulation. These rewards may be cumulative expected rewards at each configuration of the respective simulation and/or may include actual rewards determined at each configuration.

The posterior distribution $\overline{\pi_1}$ may alternatively, or additionally, be determined by evaluating the simulations directly. This may include evaluating one or more characteristics of the simulations such as predicted expected rewards, entropies of the simulations, characteristics of the simulations relating to optimization criteria for the routes which are to be determined, and so forth.

Once the posterior distribution $\overline{\pi_1}$ has been determined, it is used to select a connection. For example, starting from a first configuration $S_0$ the Sequential Monte Carlo process may be used to determine a posterior distribution $\overline{\pi_1}$. The posterior distribution $\overline{\pi_1}$ might indicate that determining routes for the first and second connections in a defined order which starts with determining the first connection is preferable over a defined order which starts with determining the second connection. In this case the selection of a connection based on the posterior distribution $\overline{\pi_1}$ may be to select the first connection.

A first defined order may be preferable over a second defined order if, for example, that leads to an electrical circuit with better characteristics. These characteristics may be assessed based on criteria such as total length of connections, number of vias, routing congestion, number of turns in the connections, isolation levels between components and wiring, a proportion of the total route which is on a preferred layer of an electrical circuit, i.e. a layer of PCB, etc.

After selecting the connection, a route for the selected connection is determined. This route may be determined by any suitable method, including the method as described above with reference to FIGS. 5 to 8. Alternatively, the route may be determined based on other, pathfinding, algorithms including the A* algorithm referenced above. As can be seen in FIG. 17, there may be a plurality candidate routes 1706a and 1706b for the first connection between the first pair of terminals 1704a, 1704b. These candidate routes may be identified using the methods as described above with respect to FIGS. 10 to 13. Alternatively, these candidate routes may be predetermined based on constraints of the electrical circuit and/or user input.

Once the route for the selected connection is determined, the processing engine 1512 updates the representation 1700 by providing an action selection signal 1518 representing the determined route for the selected connection. A state signal 1520 representing the updated configuration of the representation of the electrical circuit is then received by the processing engine 1512. The process of defining one or more orders and performing a Sequential Monte Carlo process is then repeated by the processing engine 1512 in order to determine the remaining connections for the electrical circuit.

By iteratively applying the Sequential Monte Carlo process to select connections in a particular order, the system 1500 may successfully converge on, and thereby enable the design of electrical circuits based on, promising defined orders without having to use brute force techniques to evaluate and compare all possible orders in which routes for the plurality of connections may be determined.

Referring briefly again to FIG. 15, receiving a state signal 1520 before performing the next iteration of the Sequential Monte Carlo process means that the defined orders and hence the selection of each connection is dependent on a current configuration of the representation 1700 of the electrical circuit.

After the routes for the first and second connections have been determined, the method 1600 may also comprise updating the neural network based on an evaluation of the representation of the electrical circuit, e.g. based upon characteristics of the representation of the electrical circuit such as total length of connections, number of vias, routing congestion, number of turns in the connections, isolation levels between components and wiring, a proportion of the total route which is on a preferred layer of an electrical circuit, i.e. a layer of PCB, etc. In this way, a performance of the system 1500 may be assessed based on a final result of the applied method 1600. This information is then used by the processing engine 1512 to update the neural network 1502 such that subsequent circuits that are to be designed using the neural network 1502 are able to more quickly converge on defined orders in which to determine connections. This in turn reduces the amount of computational effort needed to determine routes in the circuit.

Determining the routes for connecting the first and second connections may also involve generating target action selection data 1802 based on the posterior distribution $\overline{\pi_1}$ and storing the target action selection data 1802 in association with the configuration of the representation 1700 of the electrical circuit for training the neural network 1502 at each iteration. As the routes are determined the neural network 1502 can be trained using the target action selection data 1802. This allows future look ahead searches used to select each subsequent connection to be guided by an updated neural network 1502, thereby increasing the effectiveness of the look ahead search.

In many applications of the present method 1700, the number of connections to be made, and hence the number of defined orders, can be very large. In fact, in the absence of suitable constraints, the number of orders which are possible is proportional to a factorial of the number of connections in the plurality of connections. Consequently, the Sequential Monte Carlo process used to search the plurality of candidate routes allows an efficient search to be performed while also maintaining a lower memory usage than if an MCTS process were used to perform the look ahead search. Further the memory usage is also more predictable when compared to MCTS methods. When implementing Sequential Monte Carlo processes, as described herein, a finite set of simulations are stored in memory which is independent on the size and/or complexity of the specified problem. Whereas, when implementing MCTS methods, the search tree grows with the size and/or complexity of the specified problem. The description of the Sequential Monte Carlo process provided above, in relation to FIGS. 1 to 8, is applicable to the Sequential Monte Carlo process of the present example except that the selected actions are representative of the selection of connections. After selecting a connection, the route for the connection is determined and used to update the representation 1700.

As is also described above, in some cases these weight values $W^1, W^2, \ldots, W^M$ may also be dependent on entropy values associated with each simulation. In this case, the entropy values are dependent on the selected connections which are comprised in the sequences of configurations and connections of the simulations. The distributions $\overline{a_t^m}$ used to select the respective connections are used by the processing engine 1512 to determine the entropy values used to update the weight values $W^1, W^2, \ldots, W^M$. It will be appreciated that other features relating to the method of using a Sequential Monte Carlo process to perform a look ahead search described with reference to FIGS. 1 to 3, which have not been explicitly mentioned in the example of circuit design, are applicable. For example, monitoring and redistributing the simulations while they are being generated may also be performed by the processing engine 1512 in this specific example of circuit design.

Figure 19:
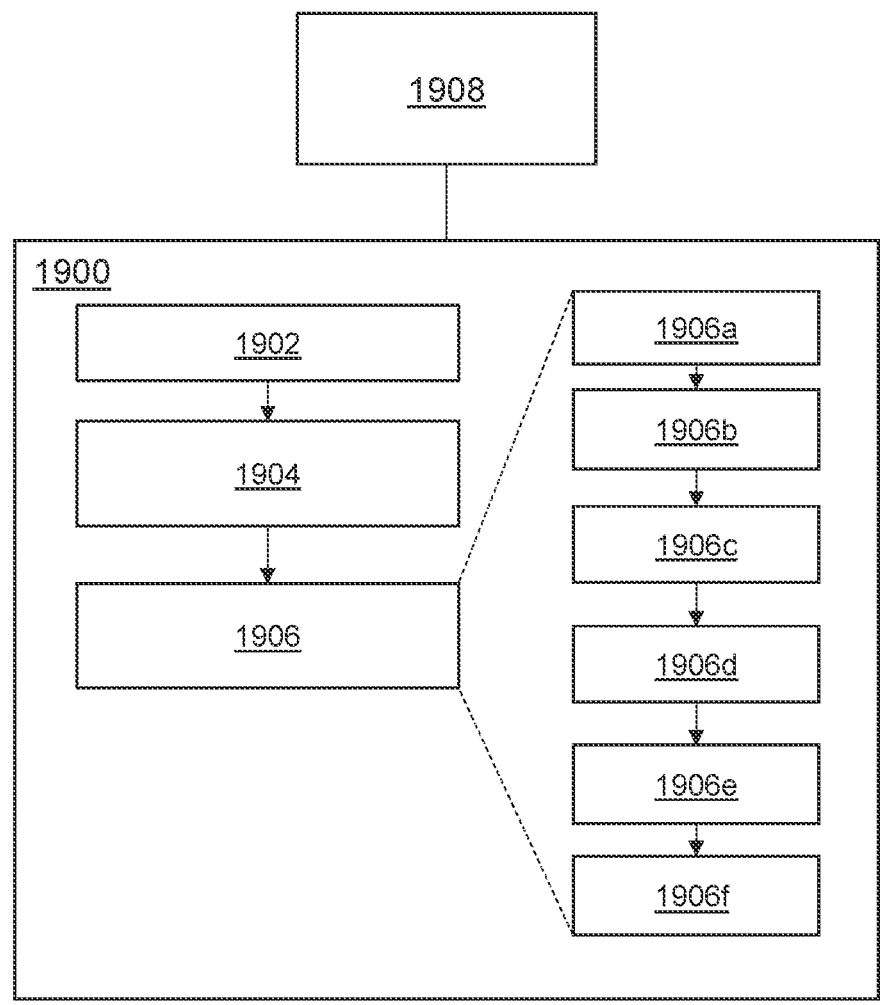
FIG. 19 is a schematic illustration of a non-transitory computer-readable storage medium comprising computer-readable instructions according to an example.

FIG. 19 shows a non-transitory computer-readable storage medium 1900 comprising computer-readable instructions 1902 to 1906f which, when executed by at least one processor 1908, cause the at least one processor 1908 to perform the method 1600 as described above in relation to FIGS. 15 to 18. In FIG. 19, the blocks 1902 to 1906f shown correspond to the blocks 1602 to 1606f shown in FIG. 11 where the suffix corresponds to the same steps. In other words, block 1602 of the flow chart in FIG. 16 corresponds to the block 1902 in FIG. 19, block 1604 corresponds to block 1904 and so on.

The above disclosure is to be understood as illustrative examples of the invention. Further embodiments of the invention are envisaged. It is to be understood that any feature described in relation to any one example may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Numbered Clauses The following numbered clauses describe various embodiments of the present disclosure.

1. A computer-implemented method of training a neural network having a plurality of network parameter values, the neural network being used to instruct an agent to select actions for interacting with an environment to determine a solution to a specified problem,
wherein the neural network is adapted to receive a state signal representing a state of the environment and to process the state signal according to the plurality of network parameter values to generate action selection data representing an action selection policy for selecting an action to be performed by the agent in response to the state signal,
wherein the computer-implemented method comprises:
receiving a state signal representing a current state of the environment;
using a Sequential Monte Carlo process to perform a search to determine target action selection data associated with the current state of the environment, the Sequential Monte Carlo process comprising:
generating a plurality of simulations each comprising a respective sequence of states and selected actions, each respective sequence starting at a first state of the environment and ending in a respective second state of the environment wherein the actions are selected using the neural network, and wherein at each state a weight value associated with the respective simulation is updated;
storing data indicative of the plurality of simulations in a buffer as the plurality of simulations are generated; and
determining the target action selection data by evaluating the weight values associated with the plurality of simulations;
storing the determined target action selection data in association with the state signal representing the current state of the environment for updating the network parameter values; and
updating the current state of the environment by providing an action selection signal based on the determined target action selection data.

2. A computer-implemented method according to clause 1, wherein the computer-implemented method is repeated until the environment is in a terminal state, and wherein the computer-implemented method further comprises training the neural network using the stored target action selection data based on an evaluation of the terminal state of the environment.

3. A computer-implemented method according to clause 1 or clause 2, wherein the buffer has a fixed capacity and storing data indicative of the plurality of simulations in the buffer includes replacing data previously stored in the buffer with data indicative of the plurality of simulations.

4. A computer-implemented method according to any preceding clause, wherein the neural network is adapted to generate predicted expected reward data in response to the received state signal by processing the received state signal according to the network parameter values, and wherein the action selection data comprises predicted expected reward data generated by the neural network.

5. A computer-implemented method according to any preceding clause, wherein selecting actions using the neural network to generate a said simulation of the plurality of simulations comprises at a said state of the said simulation using the neural network to determine at least a distribution over available actions and selecting an available action based on at least the distribution.

6. A computer-implemented method according to any preceding clause, wherein generating the plurality of simulations comprises:
monitoring the weight values associated with the plurality of simulations;
selecting a first subset of the plurality of simulations for regeneration based on the monitoring; and
regenerating the first subset of the plurality of simulations by cloning a second subset of the plurality of simulation which were not selected for regeneration.

7. A computer-implemented method according to clause 6, wherein selecting the first subset of the plurality of simulations is triggered based on the monitoring.

8. A computer-implemented method according to clause 6 or clause 7, wherein the monitoring comprises comparing the weight values with a predetermined threshold.

9. A computer-implemented method according to clause 6 or clause 7, wherein the monitoring comprises updating a plurality of variance measures associated with the weight values and comparing the plurality of variance measures to a predetermined threshold.

10. A computer-implemented method according to any preceding clause, wherein the weight value for a said simulation is updated based on predicted expected reward data for each state of the said simulation.

11. A computer-implemented method according to any preceding clause, wherein each simulation is associated with an entropy value, the entropy value being iteratively updated according to the sequence of actions, and wherein the weight values of the simulations are updated according to their respective associated entropy value.

12. A machine learning system for training a neural network, the neural network being used to instruct an agent to select actions for interacting with an environment to determine a solution to a specified problem, the system comprising:
a neural network having a plurality of network parameter values, the neural network being adapted to receive a state signal representing a state of an environment and to process the state signal according to the plurality of network parameter values to generate action selection data representing an action selection policy for selecting an action to be performed by the agent in response to the state signal;
a buffer;
a training engine adapted to perform an iterative process, the iterative process comprising, iteratively:
receiving a state signal representing a current state of the environment;
using a Sequential Monte Carlo process to perform a search to determine target action selection data associated with a current state of the environment, the Sequential Monte Carlo process comprising:
generating a plurality of simulations each comprising a respective sequence of states and selected actions, each respective sequence starting from a first state of the environment and ending in a respective second state of the environment wherein the actions are selected using the neural network, and wherein at each state a weight value associated with the respective simulation is updated;

storing data indicative of the plurality of simulations in the buffer as the plurality of simulations are generated; and determining the target action selection data by evaluating the weight values associated with the plurality of simulations;

store the target action selection data in association with the state signal representing the first state of the environment for updating the network parameter values of the neural network; and update the current state of the environment by providing an action selection signal according to the target action selection data.

13. A non-transitory computer-readable storage medium comprising computer readable instructions stored thereon which, when executed by at least one processor, cause the at least one processor to perform the method according to any of clauses 1 to 11.

What is claimed is:

1. A computer-implemented method of training a neural network having a plurality of network parameter values, the neural network being used to instruct an agent to select actions for interacting with an environment to determine a solution to a specified problem, wherein the neural network is adapted to receive a state signal representing a state of the environment and to process the state signal according to the plurality of network parameter values to generate action selection data representing an action selection policy for selecting an action to be performed by the agent in response to the state signal, wherein the computer-implemented method comprises:

receiving a state signal representing a current state of the environment;

using a Sequential Monte Carlo process to perform a search to determine target action selection data associated with the current state of the environment, the Sequential Monte Carlo process comprising:

generating a plurality of simulations each comprising a respective sequence of states and selected actions, each respective sequence starting at a first state of the environment and ending in a respective second state of the environment wherein the actions are selected using the neural network, and wherein at each state a weight value associated with the respective simulation is updated, wherein generating the plurality of simulations comprises:
monitoring weight values associated with the plurality of simulations;
selecting a first subset of the plurality of simulations for regeneration based on the monitoring; and
regenerating the first subset of the plurality of simulations by cloning a second subset of the plurality of simulations which were not selected for regeneration;

storing data indicative of the plurality of simulations in a buffer as the plurality of simulations are generated; and determining the target action selection data by evaluating the weight values associated with the plurality of simulations;

storing the determined target action selection data in association with the state signal representing the current state of the environment for updating the network parameter values; and updating the current state of the environment by providing an action selection signal based on the determined target action selection data.

2. The computer-implemented method according to claim 1, wherein the computer-implemented method is repeated until the environment is in a terminal state, and wherein the computer-implemented method further comprises training the neural network using the stored target action selection data based on an evaluation of the terminal state of the environment.

3. The computer-implemented method according to claim 1, wherein the buffer has a fixed capacity and storing data indicative of the plurality of simulations in the buffer includes replacing data previously stored in the buffer with data indicative of the plurality of simulations.

4. The computer-implemented method according to claim 1, wherein the neural network is adapted to generate predicted expected reward data in response to the received state signal by processing the received state signal according to the network parameter values, and wherein the action selection data comprises predicted expected reward data generated by the neural network.

5. The computer-implemented method according to claim 1, wherein selecting actions using the neural network to generate a said simulation of the plurality of simulations comprises at a said state of the said simulation using the neural network to determine at least a distribution over available actions and selecting an available action based on at least the distribution.

6. The computer-implemented method according to claim 1, wherein selecting the first subset of the plurality of simulations is triggered based on the monitoring.

7. The computer-implemented method according to claim 1, wherein the monitoring comprises comparing the weight values with a predetermined threshold.

8. The computer-implemented method according to claim 1, wherein the monitoring comprises updating a plurality of variance measures associated with the weight values and comparing the plurality of variance measures to a predetermined threshold.

9. The computer-implemented method according to claim 1, wherein the weight value for a said simulation of the plurality of simulations is updated based on predicted expected reward data for each state of the said simulation.

10. The computer-implemented method according to claim 1, wherein each simulation is associated with an entropy value, the entropy value being iteratively updated according to the sequence of actions, and wherein the weight values of the simulations are updated according to their respective associated entropy value.

11. A machine learning system for training a neural network, the neural network being used to instruct an agent to select actions for interacting with an environment to determine a solution to a specified problem, the system comprising:

a neural network having a plurality of network parameter values, the neural network being adapted to receive a state signal representing a state of an environment and to process the state signal according to the plurality of network parameter values to generate action selection data representing an action selection policy for selecting an action to be performed by the agent in response to the state signal;

a buffer;

a training engine adapted to perform an iterative process, the iterative process comprising, iteratively:

receiving a state signal representing a current state of the environment;

using a Sequential Monte Carlo process to perform a search to determine target action selection data associated with a current state of the environment, the Sequential Monte Carlo process comprising:

generating a plurality of simulations each comprising a respective sequence of states and selected actions, each respective sequence starting from a first state of the environment and ending in a respective second state of the environment wherein the actions are selected using the neural network, and wherein at each state a weight value associated with the respective simulation is updated, wherein generating the plurality of simulations comprises:

monitoring weight values associates with the plurality of simulations;

selecting a first subset of the plurality of simulations for regeneration based on the monitoring; and regenerating the first subset of the plurality of simulations by cloning a second subset of the plurality of simulations which were not selected for regeneration;

storing data indicative of the plurality of simulations in the buffer as the plurality of simulations are generated; and determining the target action selection data by evaluating the weight values associated with the plurality of simulations;

store the target action selection data in association with the state signal representing the first state of the environment for updating the network parameter values of the neural network; and update the current state of the environment by providing an action selection signal according to the target action selection data.

12. A non-transitory computer-readable storage medium comprising computer readable instructions stored thereon which, when executed by at least one processor, cause the at least one processor to perform the method according to claim 1.

* * * * *